US006950907B2

(12) United States Patent
Garnett et al.

(10) Patent No.: US 6,950,907 B2
(45) Date of Patent: Sep. 27, 2005

(54) ENHANCED PROTECTION FOR MEMORY MODIFICATION TRACKING WITH REDUNDANT DIRTY INDICATORS

(75) Inventors: Paul Jeffrey Garnett, Camberley (GB); Jeremy Graham Harris, Chalfont St Giles (GB)

(73) Assignee: Sun Microsystems, Inc., Santa Clara, CA (US)

( * ) Notice: Subject to any disclaimer, the term of this patent is extended or adjusted under 35 U.S.C. 154(b) by 375 days.

(21) Appl. No.: 09/939,077

(22) Filed: Aug. 24, 2001

(65) Prior Publication Data

US 2002/0065986 A1 May 30, 2002

(30) Foreign Application Priority Data

Nov. 29, 2000 (GB) .............................................. 0029103

(51) Int. Cl.[7] .............................................. G06F 13/00
(52) U.S. Cl. ...................... 711/144; 711/145; 711/120; 711/162; 714/6; 714/13
(58) Field of Search ................................ 711/120, 144, 711/145, 133, 158, 159, 162, 117, 172; 714/6, 13, 43; 710/22

(56) References Cited

U.S. PATENT DOCUMENTS

| | | | | |
|---|---|---|---|---|
| 5,166,883 A | * | 11/1992 | Gilham ........................ | 705/406 |
| 5,276,899 A | | 1/1994 | Necker | |
| 5,301,287 A | * | 4/1994 | Herrell et al. .............. | 711/202 |
| 5,553,266 A | * | 9/1996 | Metzger et al. ............. | 711/144 |
| 5,692,150 A | * | 11/1997 | Moriyama et al. .......... | 711/135 |
| 5,790,776 A | | 8/1998 | Sonnier et al. | |
| 5,838,894 A | | 11/1998 | Horst | |
| 5,845,298 A | * | 12/1998 | O'Connor et al. .......... | 707/206 |
| 5,895,485 A | * | 4/1999 | Loechel et al. ............. | 711/119 |
| 5,953,742 A | | 9/1999 | Williams | |
| 5,987,544 A | * | 11/1999 | Bannon et al. ............. | 710/100 |
| 5,991,900 A | * | 11/1999 | Garnett ........................ | 714/56 |
| 6,047,392 A | | 4/2000 | Liddell et al. | |
| 6,138,198 A | * | 10/2000 | Garnett et al. .............. | 710/311 |
| 6,141,766 A | * | 10/2000 | Liddell et al. .............. | 713/400 |
| 6,148,348 A | * | 11/2000 | Garnett et al. ................ | 710/14 |

(Continued)

FOREIGN PATENT DOCUMENTS

WO WO 9966416 A2 * 12/1999 ........... G06F/13/40

OTHER PUBLICATIONS

UK Combined Search and Examination Report, application No. GB0029103.9, filed Nov. 29, 2000.

*Primary Examiner*—Hong Kim
(74) *Attorney, Agent, or Firm*—Meyertons Hood Kivlin Kowert & Goetzel, P.C.; B. Noël Kivlin

(57) ABSTRACT

A dirty memory subsystem includes storage operable to store redundant copies of dirty indicators. Each dirty indicator is associated with a respective block of main memory and is settable to a predetermined state to indicate that the block of main memory associated therewith has been dirtied. By providing redundant storage for the dirty indicators, any difference between the stored copies of the dirty indicators can be considered as indicative of memory corruption, for example as a result of a cosmic ray impact. As the different copies can be stored in different locations, it is unlikely that a cosmic ray impact would affect all copies equally. If a difference between the stored copies is detected, then the dirty indicator can be take as being unreliable and remedial action can be taken. For example, it can be assumed that a block of main memory has been dirtied if any of the copies of the dirty indicator has the predetermined state. Such a memory finds application in a method of managing reinstatement of an equivalent memory state in the main memory of a plurality of processing sets of a fault tolerant computer following a lock step error.

28 Claims, 14 Drawing Sheets

U.S. PATENT DOCUMENTS

| | | |
|---|---|---|
| 6,151,689 A | 11/2000 | Garcia et al. |
| 6,167,477 A | 12/2000 | Garnett et al. |
| 6,233,702 B1 | 5/2001 | Horst et al. |
| 6,260,159 B1 * | 7/2001 | Garnett et al. ............. 714/15 |
| 6,272,033 B1 * | 8/2001 | Watt ........................... 365/49 |
| 6,289,022 B1 | 9/2001 | Gale et al. |
| 6,496,940 B1 | 12/2002 | Horst et al. |
| 6,622,219 B2 | 9/2003 | Tremblay et al. |
| 6,640,287 B2 | 10/2003 | Gharachorloo et al. |
| 6,782,453 B2 | 8/2004 | Keltcher et al. |
| 6,785,763 B2 | 8/2004 | Garnett et al. |
| 6,785,777 B2 | 8/2004 | Garnett et al. |
| 2002/0065996 A1 | 5/2002 | Garnett et al. |
| 2002/0066049 A1 | 5/2002 | Garnett et al. |
| 2003/0182492 A1 | 9/2003 | Watkins et al. |
| 2003/0182594 A1 | 9/2003 | Watkins et al. |

* cited by examiner

ENHANCED PROTECTION FOR MEMORY MODIFICATION TRACKING WITH REDUNDANT DIRTY INDICATORS

BACKGROUND OF THE INVENTION

The invention relates to an apparatus and method for processor state reintegration.

The invention finds particular, but not exclusive, application to fault tolerant computer systems such as lockstep fault tolerant computers which use multiple subsystems that run identically.

In such lockstep fault tolerant computer systems, the outputs of the subsystems are compared within the computer and, if the outputs differ, some exceptional repair action is taken.

U.S. Pat. No. 5,953,742 describes a fault tolerant computer system that includes a plurality of synchronous processing sets operating in lockstep. Each processing set comprises one or more processors and memory. The computer system includes a fault detector for detecting a fault event and for generating a fault signal. When a lockstep fault occurs, state is captured, diagnosis is carried out and the faulty processing set is identified and taken offline. When the processing set is replaced a Processor Re-Integration Process (PRI) is performed, the main component of which is copying the memory from the working processing set to the replacement for the faulty one. A special memory unit is provided that is used to indicate the pages of memory in the processing sets that have been written to (i.e. dirtied) and is known as a 'dirty memory', or 'dirty RAM'. (Although the term "dirty RAM" is used in this document, and such a memory is typically implemented using Random Access Memory (RAM), it should be noted that any other type of writable storage technology could be used.) Software accesses the dirty RAM to check which pages are dirty, and can write to it directly to change the status of a page to dirty or clean. Hardware automatically changes to 'dirty' the state of the record for any page of main memory that is written to. The PRI process consists of two parts: a stealthy part and a final part. During Stealthy PRI the working processing set is still running the operating system, the whole of memory is copied once and whilst this is going on, the dirty RAM is used to record which pages are written to (dirtied). Subsequent iterations only copy those pages that have been dirtied during the previous pass.

International patent application WO 99/66402 relates to a bridge for a fault tolerant computer system that includes multiple processing sets. The bridge monitors the operation of the processing sets and is responsive to a loss of lockstep between the processing sets to enter an error mode. It is operable, following a lockstep error, to attempt reintegration of the memory of the processing sets with the aim of restarting a lockstep operating mode. As part of the mechanism for attempting reintegration, the bridge includes a dirty RAM for identifying memory pages that are dirty and need to be copied in order to reestablish a common state for the memories of the processing sets.

In the previously proposed systems, the dirty RAM comprises a bit map having a dirty bit for each block, or page, of memory. However, with a trend to increasing size of main memory and a desire to track dirtied areas of memory to a finer granularity (e.g. 1 KB) to minimise the amount of memory that needs to be copied, the size of the dirty RAM needed to track memory modifications is increasing. There is a continuing trend to increase memory size. For example main memories in the processing sets of a systems of the type described above have typically been of the order of 8 GB, but are tending to increase to 32 GB or more, for example to 128 GB and beyond. At the same time, as mentioned above, there is a desire to reduce the granularity of dirtied regions to less than the typical 8 KB page size (e.g., to 1 KB). This is to minimise the copy bandwidth required to integrate a new processing set.

With the increasing size of main memory and/or the reduced page sizes, the number of bits, and consequently the size of the dirty RAM that is needed to track memory changes can become large. As a result of this, the time needed to search the dirty RAM to identify pages that may have been modified and will need to be re-copied, can increase to a point that it impacts on the time taken to re-integrate the main memory in the processing sets. Another problem that can occur is increased risk of errors in the dirty RAM.

As a hardware dirty RAM is typically implemented using static RAM, there is a small risk that errors can occur in operation, for example due to cosmic rayor alpha particle impacts with the static RAM. This is particularly a problem in high altitudes or when the package contains alpha emitter contamination. Although this is one possible cause of faults, the problem is to be able to detect and address possible faults in the operation of a dirty RAM.

Accordingly, an aim of the present invention is to cope with spontaneous errors in the operation of a dirty RAM.

SUMMARY OF THE INVENTION

Particular and preferred aspects of the invention are set out in the accompanying independent and dependent claims.

In one aspect, the invention provides a dirty memory subsystem for a computer system. The dirty memory subsystem includes storage operable to store redundant copies of dirty indicators, each dirty indicator being associated with a respective block of main memory and being settable to a predetermined state to indicate that the block of main memory associated therewith has been dirtied.

By providing redundant storage for the dirty indicators, any difference between the stored copies of the dirty indicators can be considered as indicative of memory corruption, for example as a result of a cosmic ray impact. As the different copies can be stored in different locations, it is unlikely that a cosmic ray impact would affect all copies equally. If a difference between the stored copies is detected, then the dirty indicator can be take as being unreliable and remedial action can be taken.

In a preferred embodiment of the invention, it is assumed that a block of main memory has been dirtied if any of the copies of the dirty indicator has the predetermined state.

Another remedial approach could be taken, but in practice, the approach adopted has less of an overall impact on performance. Thus, when a discrepancy is detected, it is assumed that the block of memory has been dirtied and therefore the block of memory needs to be copied between memories. The dirty indicators are then reset as the pages that have been copied are consequently not dirty—until they are written to again, of course.

Accordingly, a preferred embodiment of the invention further includes control logic operable to read the redundant copies of a dirty indicator from storage and to treat the block of memory associated therewith as dirtied if at least one of the redundant copies of the dirty indicator has the predetermined state.

The control logic is also operable to cause the block of memory associated with a dirty indicator for which at least one copy thereof has the predetermined state to be copied from the main memory to another memory (e.g., another main memory).

Each of the redundant copies of a dirty indicator is reset to a state other than the predetermined state after reading the redundant copies of the dirty indicator.

In a preferred embodiment the storage comprises at least two memory units each for storing a redundant set of dirty indicators. These could be in completely separate integrated circuits or in different areas of the same die to reduce the chance of more than one memory being corrupted at a time.

The control logic can include comparison logic for each of the memory units for determining whether a copy of the dirty indicator is set to the predetermined state. The control logic can also include output logic responsive to the output of each comparison logic for determining whether a block of memory associated with a dirty indicator is to be treated as dirtied.

In a particular example of the invention, each dirty indicator comprises a single bit and a block of main memory is a page of main memory.

The dirty memory can be configured as a hierarchical dirty memory.

In another aspect, the invention provides a computer system including a dirty memory subsystem as set out above, and at least one processing set that includes main memory. The computer system can include a plurality of processing sets that each includes main memory. The processing sets can be operable in lockstep, the computer system comprising logic operable to attempt to reinstate an equivalent memory state in the main memory of each of the processor following a lockstep error.

In a further aspect, the invention provides a method of managing reinstatement of an equivalent memory state in the main memory of a plurality of processing sets of a fault tolerant computer following a lock step error. A dirty memory subsystem stores redundant copies of dirty indicators that are settable to a predetermined state indicative that a block of main memory associated therewith has been dirtied. The method including the performance of at least one cycle of copying any page of main memory that has been dirtied from a first processing set to each other processing set. Each cycle includes reading the redundant copies of dirty indicators from storage and treating a block of memory as dirtied if at least one of the redundant copies of the dirty indicator has the predetermined state.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF PARTICULAR EMBODIMENTS

Exemplary embodiments of the present invention are described in the following with reference to the accompanying drawings. This embodiment is based on a fault tolerant computer system that includes multiple processing sets and a bridge of the type described in WO 99/66402, but modified to include a dirty memory (or dirty RAM) associated with each processing set. It will be appreciated from the following however, that this is merely an exemplary embodiment and that the invention is not limited to such an application.

Figure 1:
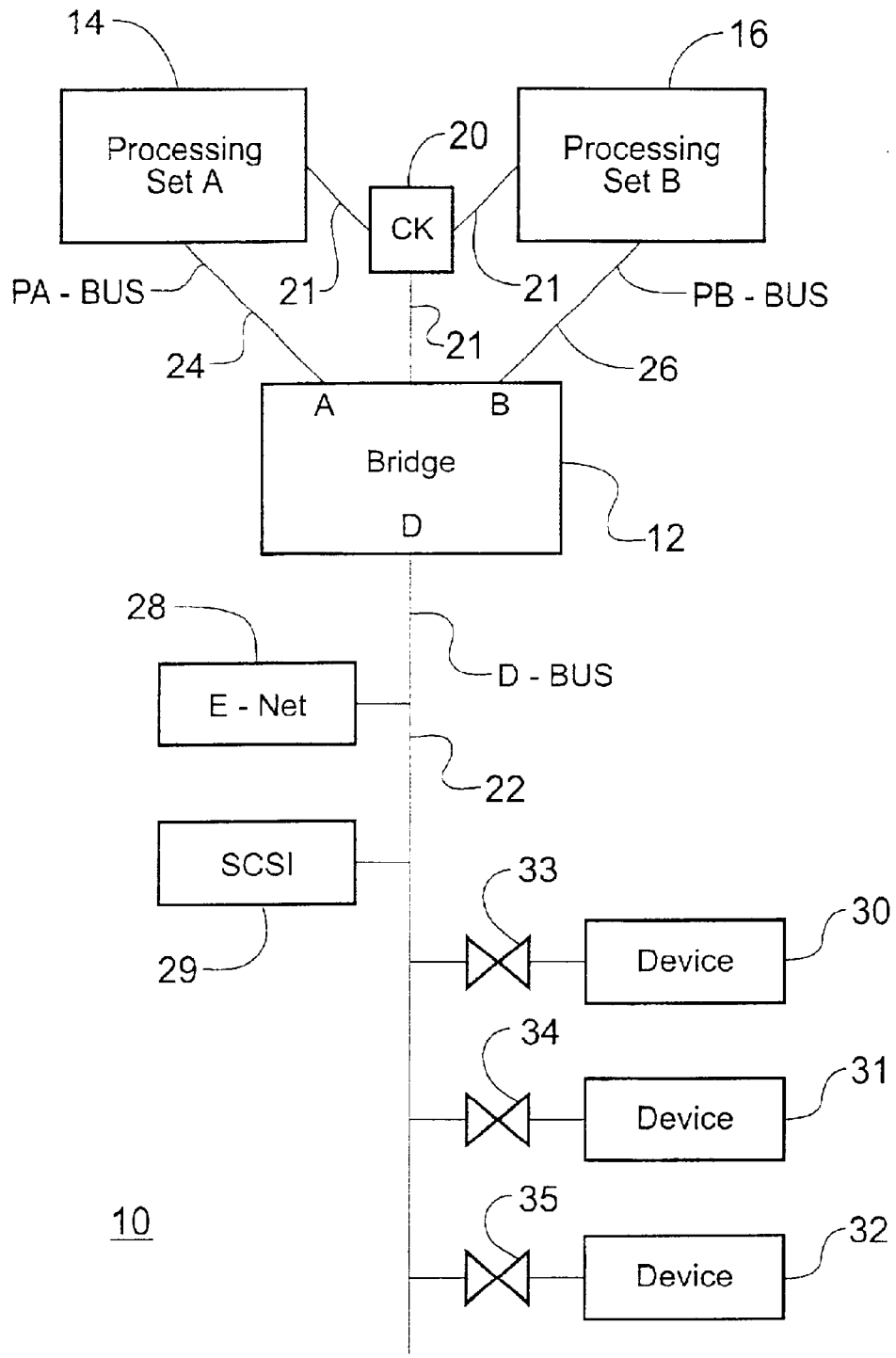
FIG. 1 is a schematic overview of a fault tolerant computer system incorporating an embodiment of the invention.

FIG. 1 is a schematic overview of a fault tolerant computing system 10 comprising a plurality of CPUsets (processing sets) 14 and 16 and a bridge 12. As shown in FIG. 1, there are two processing sets 14 and 16, although in other examples there may be three or more processing sets. The bridge 12 forms an interface between the processing sets and I/O devices such as devices 28, 29, 30, 31 and 32. In this document, the term "processing set" is used to denote a group of one or more processors, possibly including memory, which output and receive common outputs and inputs. It should be noted that the alternative term mentioned above, "CPUset", could be used instead, and that these terms could be used interchangeably throughout this document. Also, it should be noted that the term "bridge" is used to denote any device, apparatus or arrangement suitable for interconnecting two or more buses of the same or different types.

The first processing set 14 is connected to the bridge 12 via a first processing set I/O bus (PA bus) 24, in the present instance a Peripheral Component Interconnect (PCI) bus. The second processing set 16 is connected to the bridge 12 via a second processing set I/O bus (PB bus) 26 of the same type as the PA bus 24 (i.e. here a PCI bus). The I/O devices are connected to the bridge 12 via a device I/O bus (D bus) 22, in the present instance also a PCI bus.

Although, in the particular example described, the buses 22, 24 and 26 are all PCI buses, this is merely by way of example, and in other examples other bus protocols may be used and the D-bus 22 may have a different protocol from that of the PA bus and the PB bus (P buses) 24 and 26.

The processing sets 14 and 16 and the bridge 12 are operable in synchronism under the control of a common clock 20, which is connected thereto by clock signal lines 21.

Some of the devices including an Ethernet (E-NET) interface 28 and a Small Computer System Interface (SCSI) interface 29 are permanently connected to the device bus 22, but other I/O devices such as I/O devices 30, 31 and 32 can be hot insertable into individual switched slots 33, 34 and 35. Dynamic field effect transistor (FET) switching can be provided for the slots 33, 34 and 35 to enable hot insertability of the devices such as devices 30, 31 and 32. The provision of the FETs enables an increase in the length of the D bus 22 as only those devices that are active are switched on, reducing the effective total bus length. It will be appreciated that the number of I/O devices that may be connected to the D bus 22, and the number of slots provided for them, can be adjusted according to a particular implementation in accordance with specific design requirements.

Figure 2:
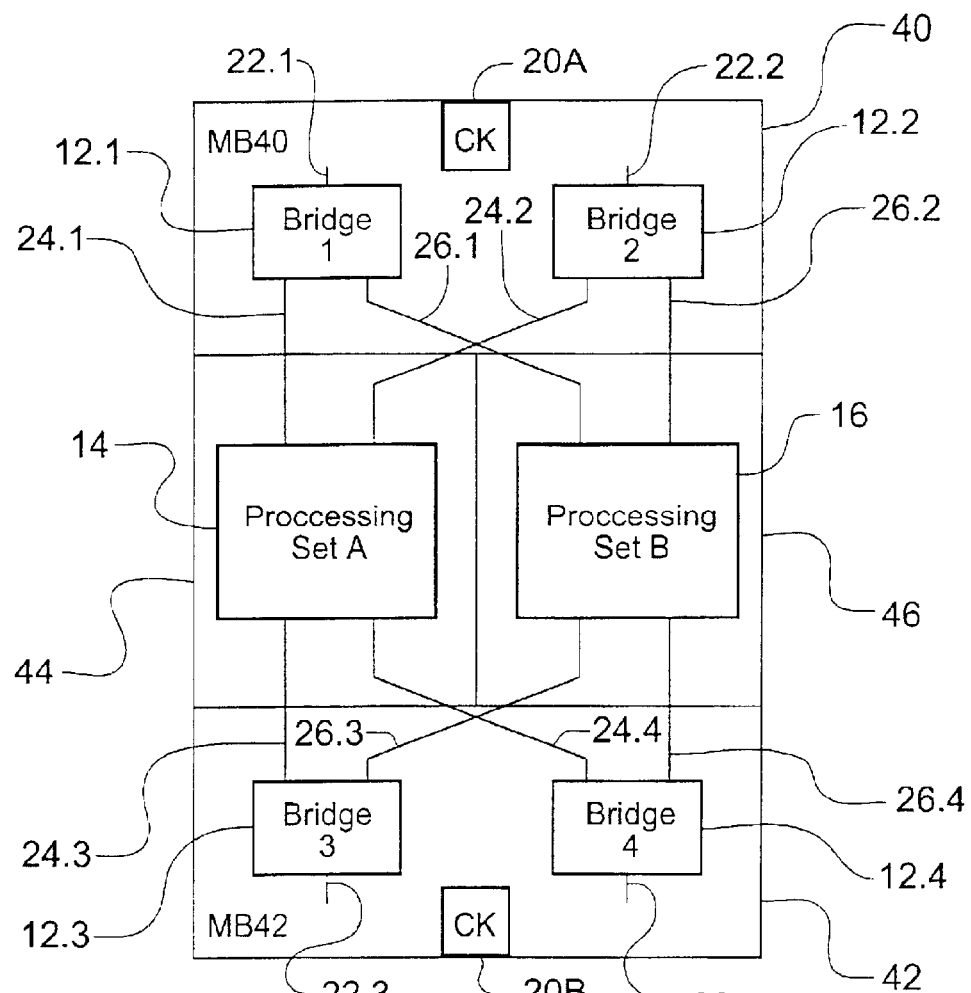
FIG. 2 is a schematic overview of a specific implementation of a system based on that of FIG. 1.

FIG. 2 is a schematic overview of a particular implementation of a fault tolerant computer employing a bridge structure of the type illustrated in FIG. 1. In FIG. 2, the fault tolerant computer system includes a plurality (here four) of bridges 12 on first and second I/O motherboards (MB 40 and MB 42) order to increase the number of I/O devices that may be connected and also to improve reliability and redundancy. Thus, in the example shown in FIG. 2, two processing sets 14 and 16 are each provided on a respective processing set board 44 and 46, with the processing set boards 44 and 46 'bridging' the I/O motherboards MB 40 and MB 42. A first, master clock source 20A is mounted on the first motherboard 40 and a second, slave clock source 20B is mounted on the second motherboard 42. Clock signals are supplied to the processing set boards 44 and 46 via respective connections (not shown in FIG. 2).

First and second bridges 12.1 and 12.2 are mounted on the first I/O motherboard 40. The first bridge 12.1 is connected to the processing sets 14 and 16 by P buses 24.1 and 26.1, respectively. Similarly, the second bridge 12.2 is connected to the processing sets 14 and 16 by P buses 24.2 and 26.2, respectively. The bridge 12.1 is connected to an I/O databus (D bus) 22.1 and the bridge 12.2 is connected to an I/O databus (D bus) 22.2.

Third and fourth bridges 12.3 and 12.4 are mounted on the second I/O motherboard 42. The bridge 12.3 is connected to the processing sets 14 and 16 by P buses 24.3 and 26.3, respectively. Similarly, the bridge 4 is connected to the processing sets 14 and 16 by P buses 24.4 and 26.4, respectively. The bridge 12.3 is connected to an I/O databus (D bus) 22.3 and the bridge 12.4 is connected to an I/O databus (D bus) 22.4.

It can be seen that the arrangement shown in FIG. 2 can enable a large number of I/O devices to be connected to the two processing sets 14 and 16 via the D buses 22.1, 22.2, 22.3 and 22.4 for either increasing the range of I/O devices available, or providing a higher degree of redundancy, or both.

Figure 3:
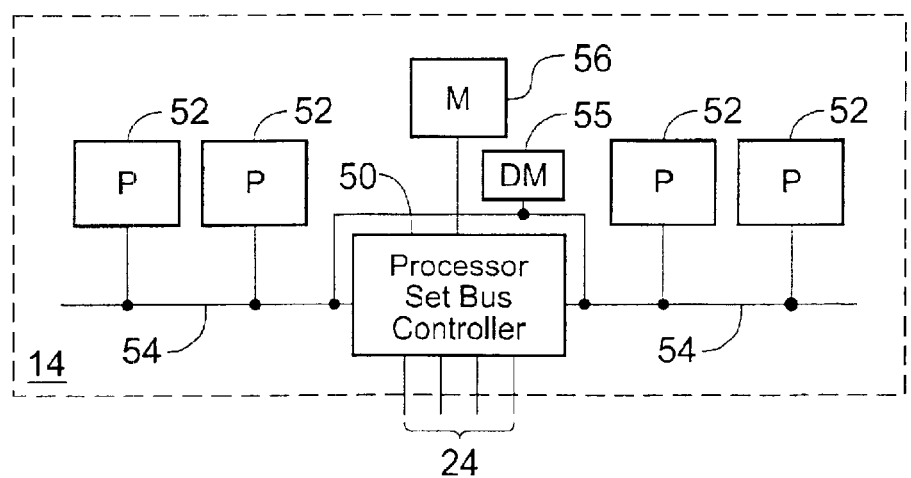
FIG. 3 is a schematic representation of one implementation of a processing set.

FIG. 3 is a schematic overview of one possible configuration of a processing set, such as the processing set 14 of FIG. 1. The processing set 16 could have the same configuration. In FIG. 3, a plurality of processors (here four) 52 is connected by one or more buses 54 to a processing set bus controller 50. A dirty RAM (dirty memory (DM)) 55 is also connected to the bus(es) 54. As shown in FIG. 3, one or more processing set output buses 24 are connected to the processing set bus controller 50, each processing set output bus 24 being connected to a respective bridge 12. For example, in the arrangement of FIG. 1, only one processing set I/O bus (P bus) 24 would be provided, whereas in the arrangement of FIG. 2, four such processing set I/O buses (P buses) 24 would be provided. In the processing set 14 shown in FIG. 3, individual processors operate using the common memory 56, and receive inputs and provide outputs on the common P bus(es) 24.

Figure 4:
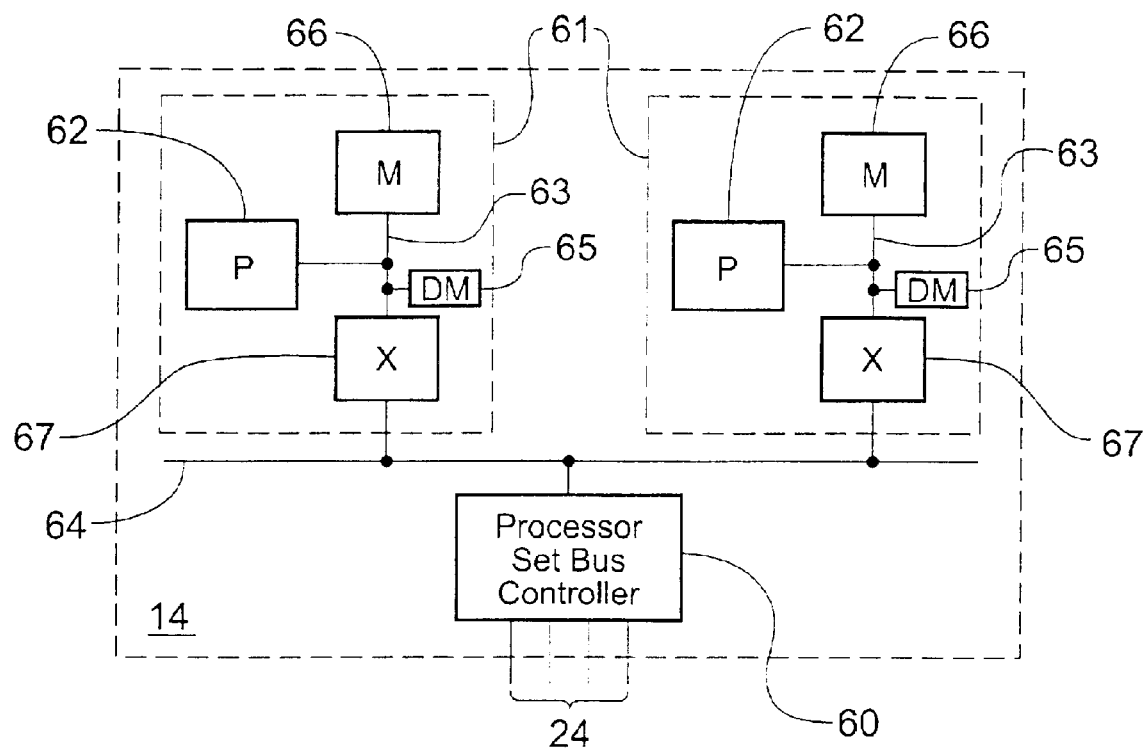
FIG. 4 is a schematic representation of another example of a processing set.

FIG. 4 is an alternative configuration of a processing set, such as the processing set 14 of FIG. 1. Here a plurality of processor/memory groups 61 is connected to a common internal bus 64. Each processor/memory group 61 includes one or more processors 62 and associated memory 66 connected to an internal group bus 63. A dirty RAM (dirty memory (DM)) 65 is also connected to each internal group bus 63. An interface 67 connects the internal group bus 63 to the common internal bus 64. As an alternative to providing the separate dirty RAMs 65 connected to each of the internal group buses 63, a single dirty RAM could be connected to the common internal bus 64. In the arrangement shown in FIG. 4, individual processing groups, with each of the processors 62 and associated memory 66 are connected via a common internal bus 64 to a processing set bus controller 60. The interfaces 67 enable a processor 62 of one processing group to operate not only on the data in its local memory 66, but also in the memory of another processing group 61 within the processing set 14. The processing set bus controller 60 provides a common interface between the common internal bus 64 and the processing set I/O bus(es) (P bus(es)) 24 connected to the bridge(s) 12. It should be noted that although only two processing groups 61 are shown in FIG. 4, it will be appreciated that such a structure is not limited to this number of processing groups.

Figure 5:
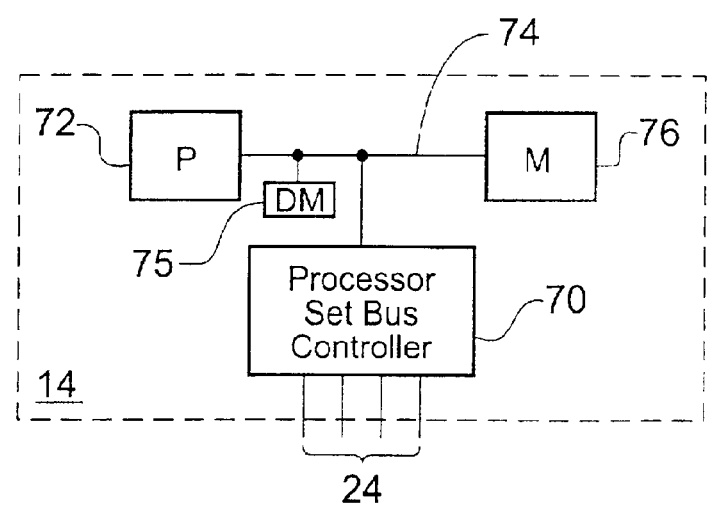
FIG. 5 is a schematic representation of a further processing set.

FIG. 5 illustrates an alternative configuration of a processing set, such as the processing set 14 of FIG. 1. Here a simple processing set includes a single processor 72 and associated memory 76 connected via a common bus 74 to a processing set bus controller 70. A dirty RAM (dirty memory (DM)) 75 is also connected to the common bus 74. The processing set bus controller 70 provides an interface between the internal bus 74 and the processing set I/O bus(es) (P bus(es)) 24 for connection to the bridge(s) 12.

Accordingly, it will be appreciated from FIGS. 3, 4 and 5 that the processing set may have many different forms and that the particular choice of a particular processing set structure can be made on the basis of the processing requirement of a particular application and the degree of redundancy required. In the following description, it is assumed that the processing sets 14 and 16 referred to have a structure as shown in FIG. 5, although it will be appreciated that another form of processing set could be provided. Also, although the construction and operation of the dirty RAM 75 for the structure shown in FIG. 5 will be described, it will be appreciated that the dirty RAM(s) of the examples shown in FIG. 3 and 4 could have equivalent constructions and operations.

Figure 6:
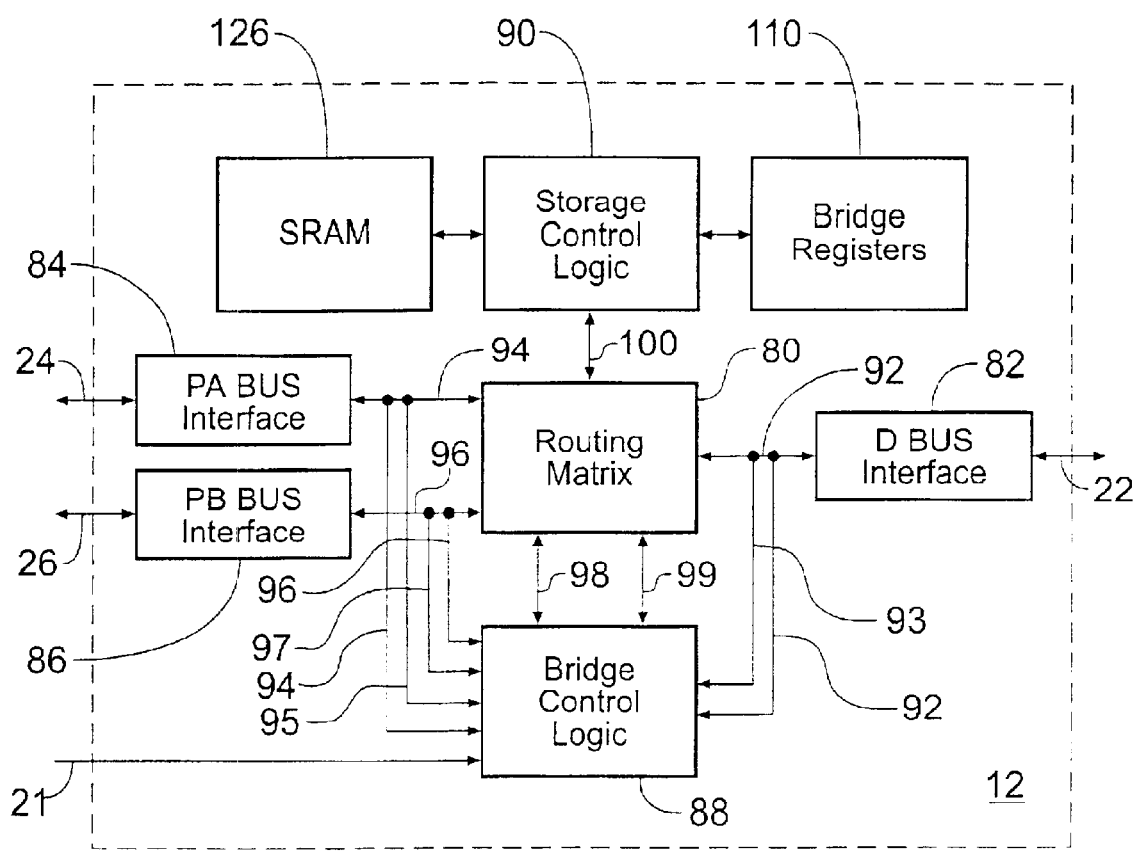
FIG. 6 is a schematic block diagram of an example of a bridge for the system of FIG. 1.

FIG. 6 is a schematic functional overview of the bridge 12 of FIG. 1.

First and second processing set I/O bus interfaces, PA bus interface 84 and PB bus interface 86, are connected to the PA and PB buses 24 and 26, respectively. A device I/O bus interface, D bus interface 82, is connected to the D bus 22. It should be noted that the PA, PB and D bus interfaces need not be configured as separate elements but could be incorporated in other elements of the bridge. Accordingly, within the context of this document, where a references is made to a bus interface, this does not require the presence of a specific separate component, but rather the capability of the bridge to connect to the bus concerned, for example by means of physical or logical bridge connections for the lines of the buses concerned.

Routing (hereinafter termed a routing matrix) 80 is connected via a first internal path 94 to the PA bus interface 84 and via a second internal path 96 to the PB bus interface 86. The routing matrix 80 is further connected via a third internal path 92 to the D bus interface 82. The routing matrix 80 is thereby able to provide I/O bus transaction routing in both directions between the PA and PB bus interfaces 84 and 86. It is also able to provide routing in both directions between one or both of the PA and PB bus interfaces and the D bus interface 82. The routing matrix 80 is connected via a further internal path 100 to storage control logic 90. The storage control logic 90 controls access to bridge registers 110 and to a random access memory (SRAM) 126. The routing matrix 80 is therefore also operable to provide routing in both directions between the PA, PB and D bus interfaces 84, 86 and 82 and the storage control logic 90. The routing matrix 80 is controlled by bridge control logic 88 over control paths 98 and 99. The bridge control logic 88 is responsive to control signals, data and addresses on internal paths 93, 95 and 97, and also to clock signals on the clock line(s) 21.

In the present example, each of the P buses (PA bus 24 and PB bus 26) operates under a PCI protocol. The processing set bus controllers 50 (see FIG. 3) also operate under the PCI protocol. Accordingly, the PA and PB bus interfaces 84 and 86 each provide all the functionality required for a compatible interface providing both master and slave operation for data transferred to and from the D bus 22 or internal memories and registers of the bridge in the storage subsystem 90. The bus interfaces 84 and 86 can provide diagnostic information to internal bridge status registers in the storage subsystem 90 on transition of the bridge to an error state (EState) or on detection of an I/O error.

The device bus interface 82 performs all the functionality required for a PCI compliant master and slave interface for transferring data to and from one of the PA and PB buses 84 and 86. The D bus 82 is operable during direct memory access (DMA) transfers to provide diagnostic information to internal status registers in the storage subsystem 90 of the bridge on transition to an EState or on detection of an I/O error.

The bridge control logic 88 performs functions of controlling the bridge in various modes of operation and is responsive to timing signals on line 21 from the clock source 20A shown in FIG. 2. The bridge(s) 12 are operable in different modes including so-called combined and split modes. In a combined mode, the bridge control logic 88 enables the bridge 12 to route addresses and data between the processing sets 14 and 16 (via the PA and PB buses 24 and 26, respectively) and the devices (via the D bus 22). In this combined mode, I/O cycles generated by the processing sets 14 and 16 are compared by the bridge control logic 88 to ensure that both processing sets are operating correctly. On detecting a comparison failure, the bridge control logic force the bridge 12 into an error-limiting mode (EState) in which device I/O is prevented and diagnostic information is collected. In a split mode, the bridge control logic 88 enables the bridge 12 to route and arbitrate addresses and data from one of the processing sets 14 and 16 onto the D bus 22 and/or onto the other one of the processing sets 16 and 14, respectively. In this mode of operation, the processing sets 14 and 16 are not synchronized and no I/O comparisons are made. DMA operations are also permitted in both modes.

Figure 7:
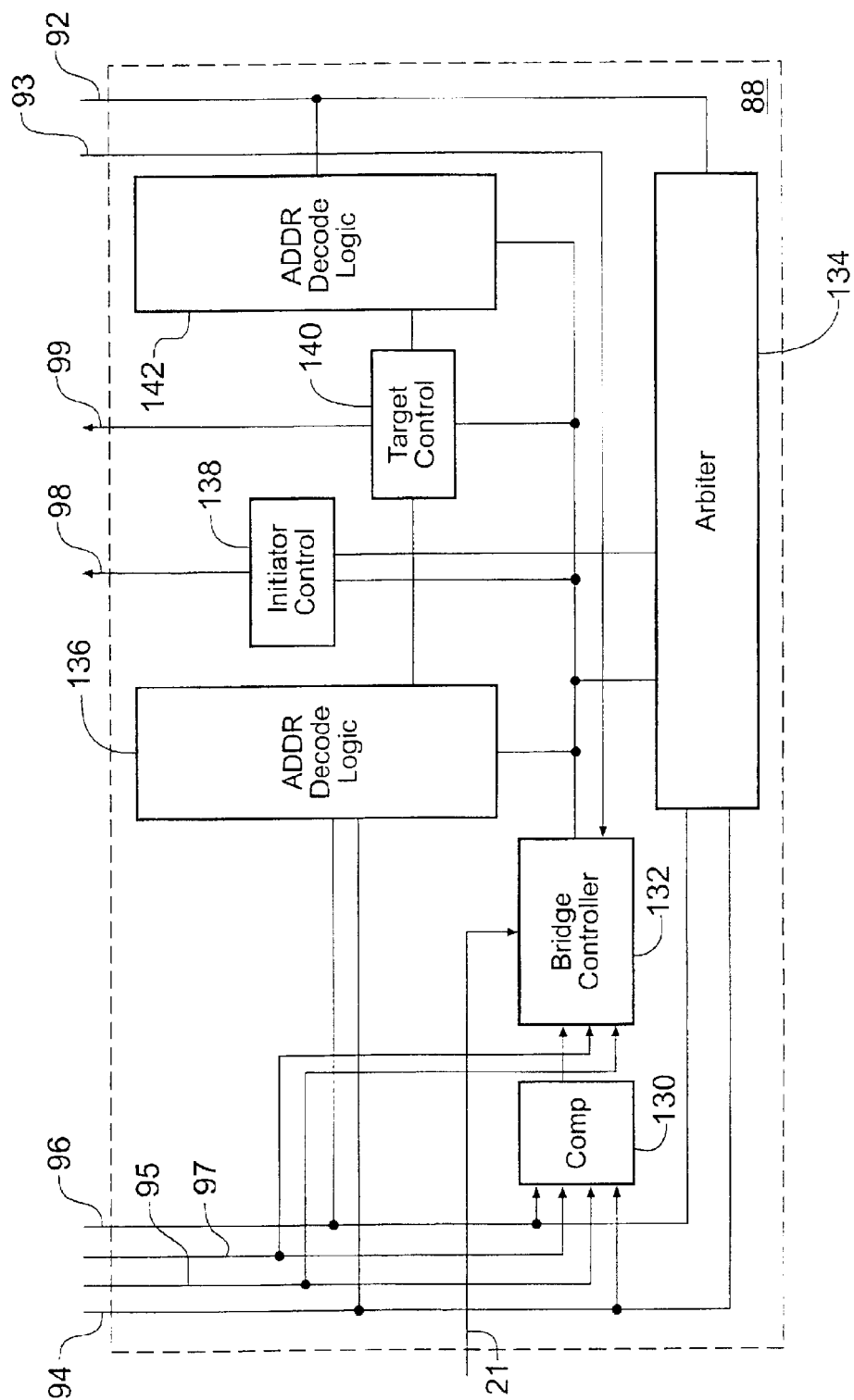
FIG. 7 is a schematic block diagram of control logic of the bridge of FIG. 6.

FIG. 7 is a schematic functional overview of the bridge control logic 88 shown in FIG. 6.

Address decoding is performed by address decode logic 136 and 138, which permits four basic access types:
  an out-of-sync access (i.e. not in the combined mode) by one processing set (e.g. processing set 14 of FIG. 1) to the other processing set (e.g. processing set 16 of FIG. 1), in which case the access is routed from the PA bus interface 84 to the PB bus interface 86;
  an access by one of the processing sets 14 and 16 in the split mode, or both processing sets 14 and 16 in the combined mode to an I/O device on the D bus 22, in which case the access is routed via the D bus interface 82;
  a DMA access by a device on the D bus 22 to one or both of the processing sets 14 and 16, which would be directed to both processing sets 14 and 16 in the combined mode, or to the relevant processing set 14 or 16 if out-of-sync, and if in a split mode to a processing set 14 or 16 which owns a slot in which the device is located; and
  a PCI configuration access to devices in I/O slots.

The addresses output by the address decoders are passed via the initiator and target controllers 138 and 140 to the routing matrix 80 via the lines 98 under control of a bridge controller 132 and an arbiter 134.

An arbiter 134 is operable in various different modes to arbitrate for use of the bridge on a first-come-first-served basis using conventional PCI bus signals on the P and D buses.

In a combined mode, the arbiter 134 is operable to arbitrate between the in-sync processing sets 14 and 16 and any initiators on the device bus 22 for use of the bridge 12. Possible scenarios are:
  processing set access to the device bus 22;
  processing set access to internal registers in the bridge 12;
  Device access to the processing set memory 56.

In split mode, both processing sets 14 and 16 must arbitrate the use of the bridge and thus access to the device bus 22 and internal bridge registers. The bridge 12 must also contend with initiators on the device bus 22 for use of that device bus 22.

A PCI bus interface in the processing set bus controller(s) 50 expects to be the master bus controller for the P bus concerned, that is it contains the PCI bus arbiter for the PA or PB bus to which it is connected. The bridge 12 cannot directly control access to the PA and PB buses 24 and 26. The bridge 12 competes for access to the PA or PB bus with the processing set on the bus concerned under the control of the bus controller 50 on the bus concerned.

Also shown in FIG. 7 are a comparator 130 and a bridge controller 132. The comparator 130 is operable to compare I/O cycles from the processing sets 14 and 16 to determine any out-of-sync events. On determining an out-of-sync event, the comparator 130 is operable to cause the bridge controller 132 to activate an EState for analysis of the out-of-sync event and possible recovery therefrom.

Figure 8:
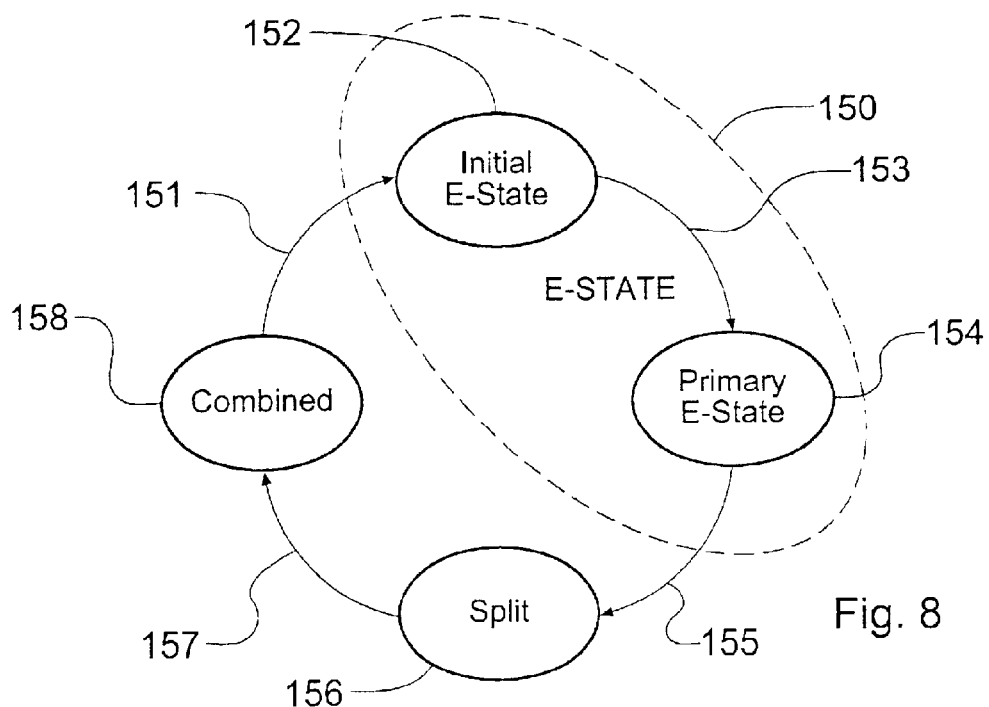
FIG. 8 is a state diagram illustrating operational states of the bridge of FIG. 6.

FIG. 8 is a transition diagram illustrating in more detail the various operating modes of the bridge. FIG. 8 illustrates the bridge operation divided into three basic modes, namely an error state (EState) mode 150, a split state mode 156 and a combined state mode 158. The EState mode 150 can be further divided into 2 states.

After initial resetting on powering up the bridge, or following an out-of sync event, the bridge is in this initial EState 152. In this state, all writes are stored in the bridge registers 110 and reads from the internal bridge registers are allowed, and all other reads are treated as errors (i.e. they are aborted). In this state, the individual processing sets 14 and 16 perform evaluations for determining a restart time. Each processing set 14 and 16 will determine its own restart timer timing. The timer setting depends on a "blame" factor for the transition to the EState. A processing set that determines that it is likely to have caused the error sets a long time for the timer. A processing set that thinks it unlikely to have caused the error sets a short time for the timer. The first processing set 14 and 16 that times out, becomes a primary processing set. Accordingly, when this is determined, the bridge moves (153) to the primary EState 154.

When either processing set 14/16 has become the primary processing set, the bridge is then operating in the primary EState 154. This state allows the primary processing set to write to bridge registers. Other writes are no longer stored in the posted write buffer, but are simply lost. Device bus reads are still aborted in the primary EState 154.

Once the EState condition is removed, the bridge then moves (155) to the split state 156. In the split state 156, access to the device bus 22 is controlled by data in the bridge registers 110 with access to the bridge storage simply being arbitrated. The primary status of the processing sets 14 and 16 is ignored. Transition to a combined operation is achieved by means of a $sync_{13}$ reset (157). After issue of the $sync_{13}$reset operation, the bridge is then operable in the combined state 158, whereby all read and write accesses on the D bus 22 and the PA and PB buses 24 and 26 are allowed. All such accesses on the PA and PB buses 24 and 26 are compared in the comparator 130. Detection of a mismatch between any read and write cycles (with an exception of specific dissimilar data I/O cycles) cause a transition 151 to the EState 150. The various states described are controlled by the bridge controller 132.

The role of the comparator 130 is to monitor and compare I/O operations on the PA and PB buses in the combined state 158 and, in response to a mismatched signal, to notify the bridge controller 132, whereby the bridge controller 132 causes the transition 151 to the error state 150. The I/O operations can include all I/O operations initiated by the processing sets, as well as DMA transfers in respect of DMA initiated by a device on the device bus.

As described above, after an initial reset, the system is in the initial EState 152. In this state, neither processing sets 14 or 16 can access the D bus 22 or the P bus 26 or 24 of the other processing set 16 or 14. The internal bridge registers 110 of the bridge are accessible, but are read only.

A system running in the combined mode 158 transitions to the EState 150 where there is a comparison failure detected in this bridge, or alternatively a comparison failure is detected in another bridge in a multi-bridge system as shown, for example, in FIG. 2. Also, transitions to an EState 150 can occur in other situations, for example in the case of a software-controlled event forming part of a self test operation.

On moving to the EState 150, an interrupt is signaled to all or a subset of the processors of the processing sets via an interrupt line 95. Following this, all I/O cycles generated on a P bus 24 or 26 result in reads being returned with an exception and writes being recorded in the internal bridge registers.

The comparator 130 is connected to paths 94, 95, 96 and 97 for comparing address, data and selected control signals from the PA and PB bus interfaces 84 and 86. A failed comparison of in-sync accesses to device I/O bus 22 devices causes a move from the combined state 158 to the EState 150.

Figure 9:
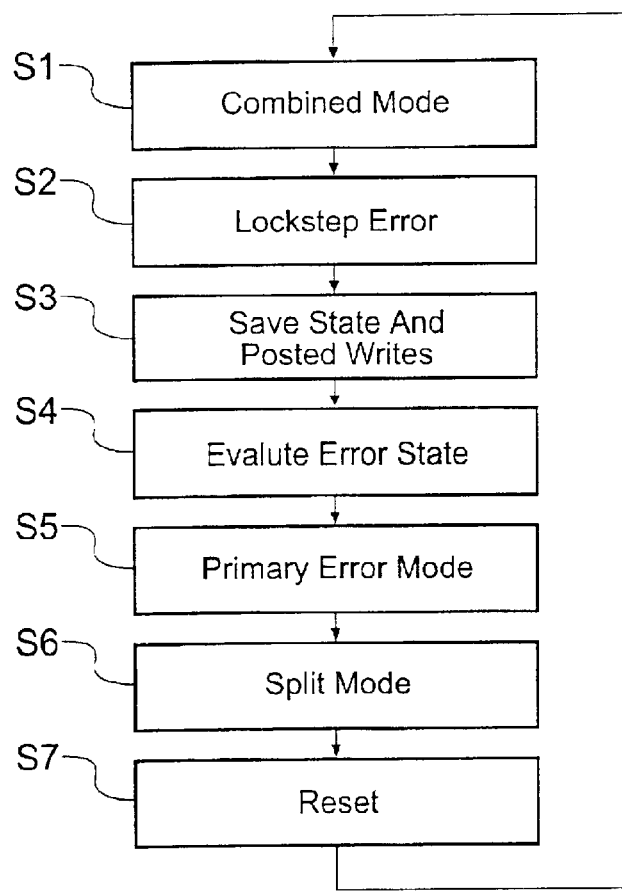
FIG. 9 is a flow diagram illustrating stages in the operation of the bridge of FIG. 6.

FIG. 9 is a flow diagram illustrating a possible sequence of operating stages where lockstep errors are detected during a combined mode of operation.

Stage S1 represents the combined mode of operation where lockstep error checking is performed by the comparator 130 shown in FIG. 7.

In Stage S2, a lockstep error is assumed to have been detected by the comparator 130.

In Stage S3, the current state is saved in selected internal bridge registers 110 and posted writes are also saved in other internal bridge registers 110

After saving the status and posted writes, at Stage S4 the individual processing sets independently seek to evaluate the error state and to determine whether one of the processing sets is faulty. This determination is made by the individual processors in an error state in which they individually read status from the control state and the internal bridge registers 110. During this error mode, the arbiter 134 arbitrates for access to the bridge 12.

In Stage S5, one of the processing sets 14 and 16 establishes itself as the primary processing set. This is determined by each of the processing sets identifying a time factor based on the estimated degree of responsibility for the error, whereby the first processing set to time out becomes the primary processing set. In Stage S5, the status is recovered for that processing set and is copied to the other processing set. The primary processing is able to access the posted write information from the internal bridge registers 110.

In Stage S6, the bridge is operable in a split mode. If it is possible to re-establish an equivalent status for the first and second processing sets, then a reset is issued at Stage S7 to put the processing sets in the combined mode at Stage S1. However, it may not be possible to re-establish an equivalent state until a faulty processing set is replaced. Accordingly the system will stay in the Split mode of Stage S6 in order to continue operation based on a single processing set. After replacing the faulty processing set the system could then establish an equivalent state and move via Stage S7 to Stage S1.

There now follows a description of an example of a mechanism for enabling automatic recovery from an EState.

The automatic recovery process includes reintegration of the state of the processing sets to a common status in order to attempt a restart in lockstep. To achieve this, the processing set which asserts itself as the primary processing set as described above copies its complete state to the other processing set. This involves ensuring that the content of the memory of both processors is the same before trying a restart in lockstep mode.

However, a problem with the copying of the content of the memory from one processing set is that a memory access may well be performed during this period, for example as a result of a device connected to the D bus 22 making a direct memory access (DMA) request for access to the memory of the primary processing set. Also, simple operation of the primary processing set, for maintaining operation of the system as a whole, can cause a write to its own memory. If a write is made to an area of memory that has already been copied, this would result in the memory state of the two processors at the end of the copy not being the same. In principle, it would be possible to inhibit writes for the whole of the copy process. However, this would be undesirable, bearing in mind that it is desirable to minimise the time that the system or the resources of the system are unavailable. It is for such reasons that the dirty RAMs 75, etc. are provided in the present system.

The structure of examples of dirty RAMs 75 for embodiments of the present invention are described in more detail hereinafter. However, for the present, it is merely necessary to know that a dirty RAM 75 provides a dirty indicator, for example a dirty bit, for each block, or page of memory. The bit for a page of memory is set when a write access to the area of memory concerned is made. The bit for a page of processing set memory is set automatically by a hardware address decoder that monitors addresses on the address bus lines of the internal bus 74 when a write access is made to that page of memory. The dirty RAM 75 can be reset, or cleared when it is read by a processing set, for example by means of read and clear instructions at the beginning of a copy pass, so that it can start to record pages which are dirtied since a given time.

Accordingly, at the end of the copy pass the bits in the dirty RAM 75 will indicate those pages of processing set memory that have been changed (or dirtied) by writes during the period of the copy. A further copy pass can then be performed for only those pages of memory that have been dirtied. This will take less time that a full copy of the memory. Accordingly, there are typically less pages marked as dirty at the end of the next copy pass and, as a result, the copy passes can become shorter and shorter. As some time it is necessary to decide to inhibit writes for a short period for a final, short, copy pass, at the end of which the memories of the two processing sets will be the same and the primary processing set can issue a reset operation to restart the combined mode.

The dirty RAM 75 address is decoded by the dirty RAM control logic from the bits that define pages addresses on the address lines of the bus 74. Erroneous accesses that present illegal combinations of these address bits can also be mapped into the dirty RAM 75 and can cause a bit to be dirtied on a write.

Figure 10:
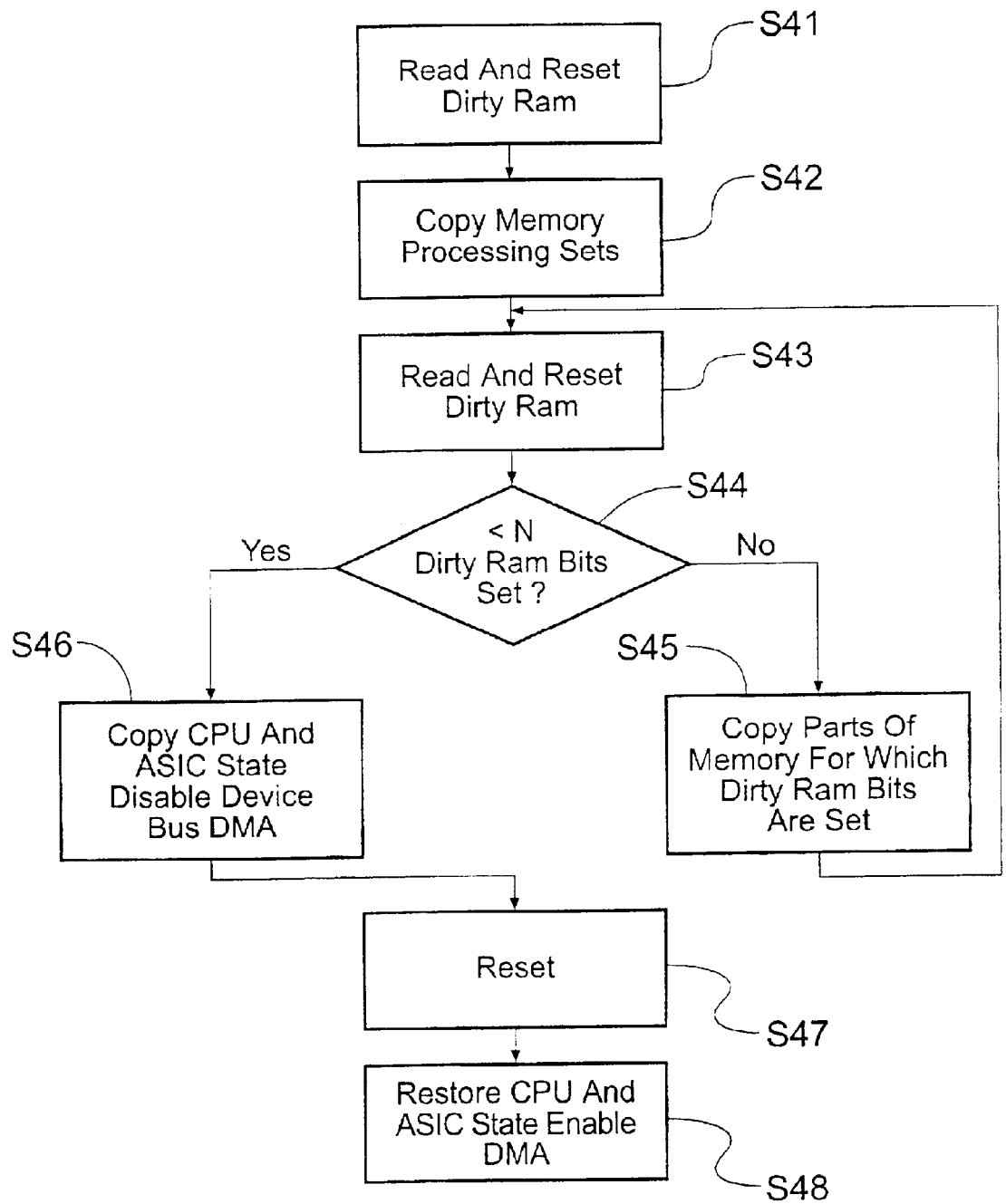
FIG. 10 is a flow diagram of a re-integration process including the monitoring of a dirty RAM.

FIG. 10 is a flow diagram summarising the operation of the dirty RAM 75 during the stealthy and final phases of processor reintegration (PRI). Steps S41–S45 relate the stealthy phase and steps S46–S48 relate to the final phase of PRI.

In stage S41, the primary processing set reads its dirty RAM 75, which has the effect of resetting the dirty RAM 75.

In stage S42, the primary processor (e.g. processing set 14) copies the whole of its memory 76 to the memory 76 of the other processing set (e.g. processing set 16).

In stage S43, the primary processing set reads the dirty RAM 75, which has the effect of resetting the dirty RAM 75.

In stage S44, the primary processor determines whether less than a predetermined number of bits have been written in the dirty RAM 75.

If more than the predetermined number of bits have been set, then the processor in stage S45 copies those pages of its memory 76 which have been dirtied, as indicated by the dirty bits read from the dirty RAM 75 in stage S43, to the memory 76 of the other processing set. Control then passes back to stage S43.

If, in stage S44, it is determined less than the predetermined number of bits have been written in the dirty RAM 75, then in Stage S46 the primary processor quiesces writes to its memory. The primary processor stops running its operating system and either takes part in the final copy process or sits idle. The Dbus 22 arbitration is also turned off to prevent DMA being carried out by the devices connected to the Dbus 22. This also means that where the copy process is performed by a DMA controller (a DMA engine) in the bridge rather than by the primary processor, this DMA controller can remain operative to effect the final copy process.

In stage S47 the primary processor can issue a reset operation for initiating a combined mode.

In stage S48, the primary processor resumes running of its operating system and Dbus 22 arbitration is once more permitted.

In contrast to prior systems, the preferred embodiment of the invention uses a hierarchical dirty RAM. The lowest level dirty RAM in the hierarchy, like the dirty RAMs of prior systems, provides a bit map having a dirty indicator, for example a dirty bit, for each block, or page, of memory, this lowest level dirty RAM being essentially a direct mapping of main memory. However, as discussed in the introduction, with a trend towards increasing size of main memory and/or a trend to reducing the size of a typical memory page, the size of the dirty RAM needed to track memory modifications is increasing. As a result of this, the time needed to search the dirty RAM to identify pages that may have been modified and will need to be re-copied, can increase to a point that it impacts on the time taken to re-integrate the main memory in the processing sets.

Accordingly, in the preferred embodiment of the present invention, in order to reduce the time needed to identify in the dirty RAM pages that have been modified, in addition to the lowest level dirty RAM, one or more higher level dirty RAMs are provided.

Figures 11, 11A:
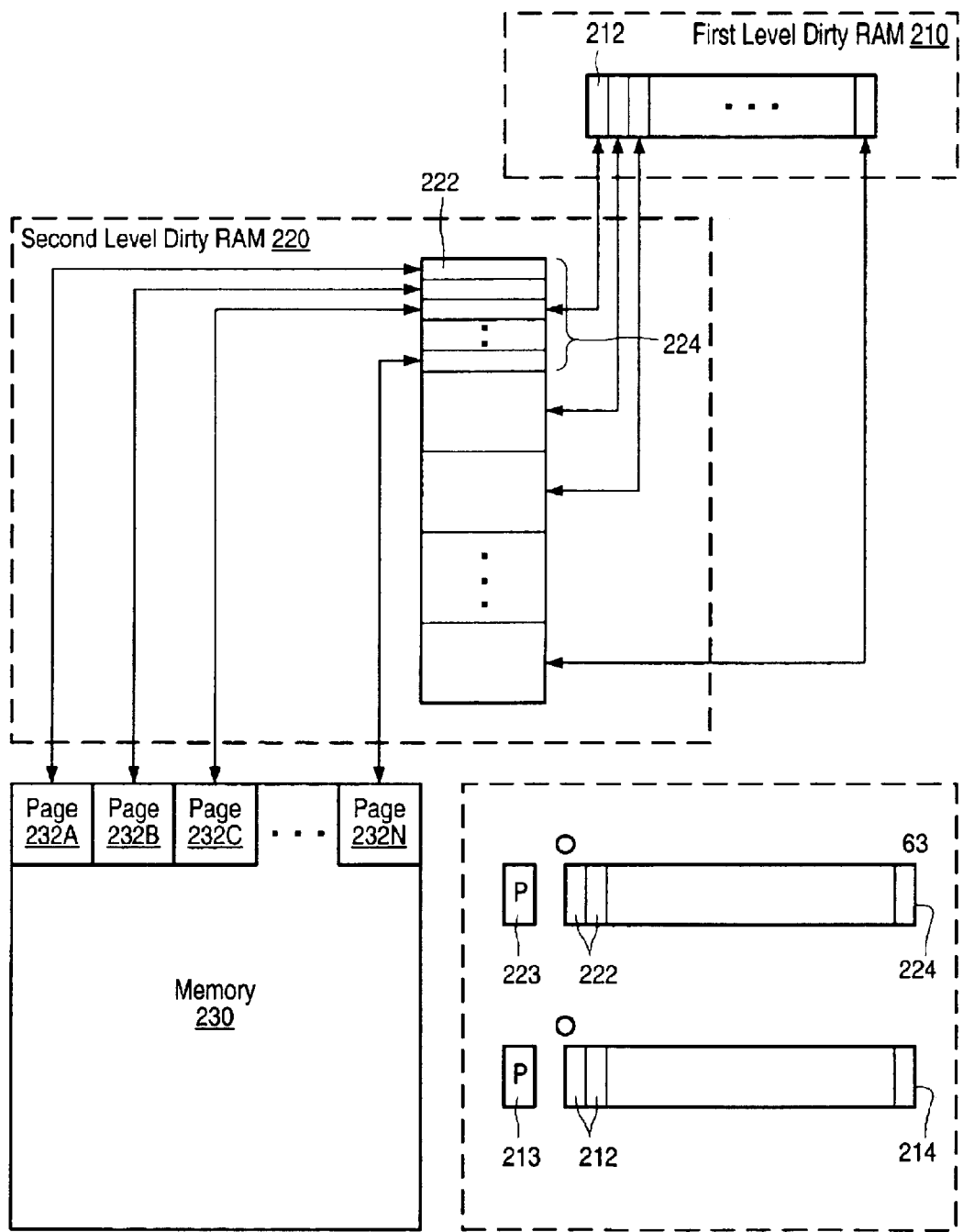
FIG. 11 illustrates a first example of a two level hierarchical dirty RAM.
FIG. 11A illustrates a word format for a particular implementation of a dirty RAM.

FIG. 11 illustrates a first example of this where a two level hierarchy is employed with a first, higher, level dirty RAM 210 and a second, lower, level dirty RAM 220.

The second level dirty RAM 220 contains a dirty indicator (e.g. a dirty bit) 222 for each page 232 of main memory 230, with each page 232 of memory 230 being associated with a respective dirty indicator 222 in the second level dirty RAM 220. In this second level dirty RAM 220, a dirty indicator will be set to a given value (say 1) if the main memory page associated therewith has been dirtied.

The second level dirty RAM 220 is divided into a plurality of logical groups 224. The first level dirty RAM 210 contains a dirty group indicator (e.g. a dirty group bit) 212 for each group 224 in the second level dirty RAM 220. In this first level dirty RAM 210, a dirty group indicator 212 will be set to a predetermined value (say 1) if the second level dirty RAM group 224 associated therewith has at least one dirty indicator 222 set to the given value.

The advantage which results from this hierarchy is that, when searching to identify which pages 232 of memory 230 have been dirtied, the first level dirty RAM 210 can be searched to identify dirty group indicators 212 that are set to the predetermined value. If a dirty group indicator 212 does not have the predetermined value, then this means that the associated group 224 in the second level cache 220 does not contain any dirty indicators 222 set to the given value and therefore does not need to be searched. On the other hand, if a dirty group indicator 212 does have the predetermined value, then this means that the associated group 224 in the second level dirty RAM 220 does have at least one dirty indicator 222 set to the given value and therefore this group 224 needs to be searched to identify the page or pages 232 of memory 230 that has or have been dirtied.

In a particular implementation as shown in FIG. 11A, each group 224 of the second level dirty RAM 220 is a 64 bit word in the second level dirty RAM 220, with each bit of that word being a respective dirty indicator (i.e. a dirty bit) 222. Each group is also associated with a separate, parity indicator (parity bit) 223. Each dirty group indicator 212 in the first level dirty RAM 210 is also formed by a single bit (dirty group bit). At least one group 214 of dirty group indicators 212 in the first level dirty RAM is also associated with a parity indicator 214 for the group.

The parity indicators can be included in the same physical memory words as the dirty indicators 222 and the dirty group indicators 212, assuming a suitable number of bits. For example, where 64-bit memory words are available, 63 dirty indicator bits 212 or dirty group indicator bits 222 could be provided in the word with the last bit occupied by the parity indicator bit (214/214). Each time a dirty indicator bit 212 or dirty group indicator bit 222 bit is updated, the dirty memory addressing logic could be caused to re-compute and restore the associated parity indicator bit for the word concerned. In practice the computation is a trivial matter that can readily be implemented in fast logic circuitry. Assuming that a memory word starts from a reset state in which all bits including the dirty indicator bits and the parity indicator bit are zero, then any single change to a validity indicator bit in the word will require that the parity indicator bit should change its state. As a result the memory addressing logic can be simply configured to toggle the parity indicator bit each time the state of a dirty indicator/dirty group indicator bit is changed.

An alternative is to simply re-compute the parity every time the dirty ram is updated, regardless of whether any dirty bits have changed state.

The parity bits do not need to be stored in the same words as the dirty indicator bits. They could be stored separately.

Figure 12:
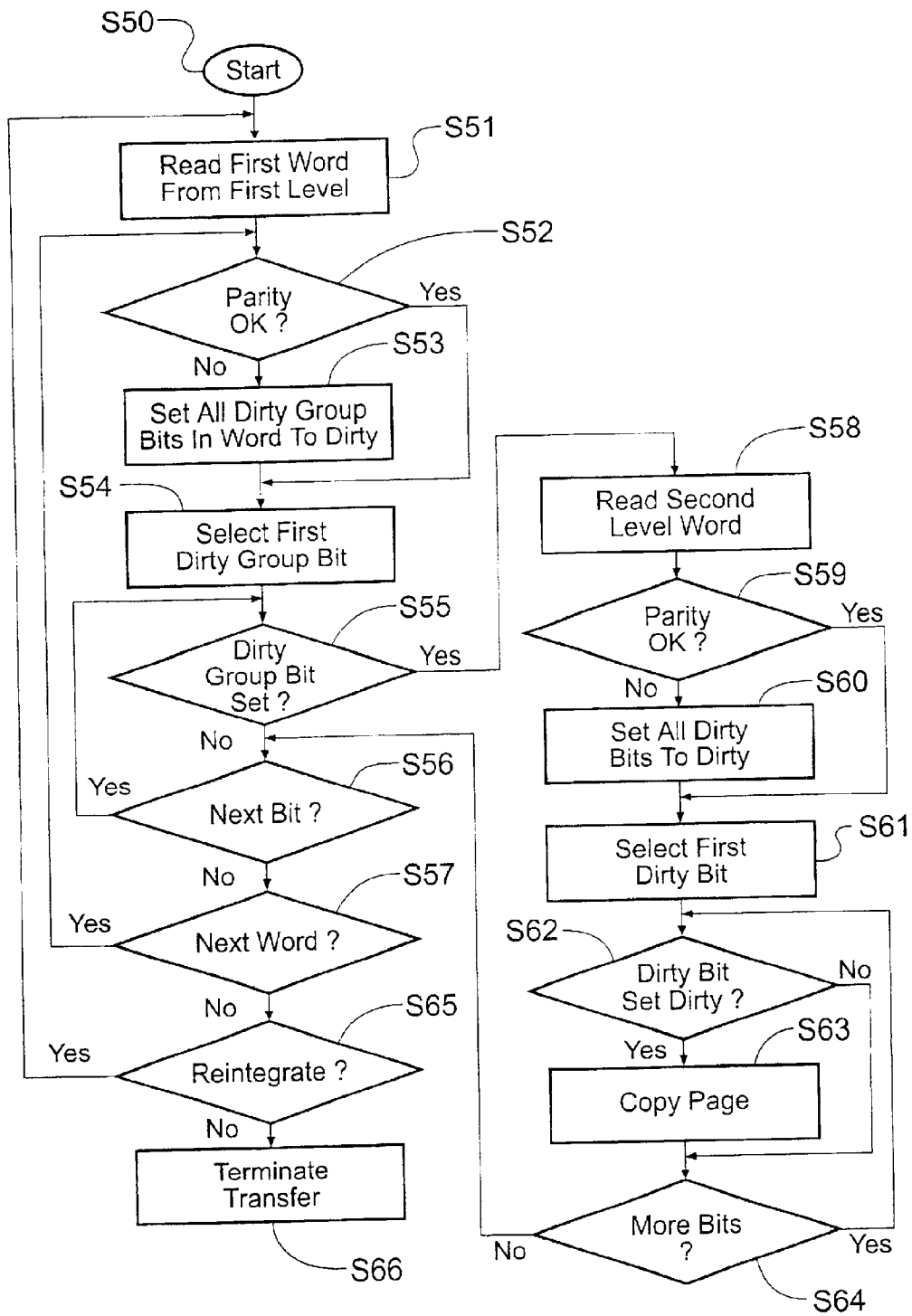
FIG. 12 is a flow diagram illustrating the operation of the dirty RAM.

FIG. 12 is a flow diagram illustrating the operation of the dirty RAM searching operation for determining pages of memory that have been dirtied.

The re-integration process is initiated in step S50.

In step S51, a first word 214 in the first level dirty RAM 210 is read from the first level dirty RAM 210.

In step S52 a parity check is made. If the parity check indicates an error, then all the dirty group bits are held to be in the dirtied (set) state (even if they are not in that state). In this case, in step S53, the control logic is either operable to set all of the dirty group bits of the word in question to the set state, or is operable to supply a false indication at step S55 (described below) simulating this. Following step S53, or in the case that no parity error is detected, control passes to step S54.

In step S54, a first dirty group bit in the selected word is selected.

In step S55 the selected dirty group bit is compared with the predetermined value (in this example "1") to determine whether it is set.

If the comparison in step S55 indicates that the selected dirty group bit is not set (in this example "0"), then in step S56, the next dirty group bit in the first level dirty RAM word 214 is selected, if there is one. If there is a further bit to be analysed in the current first level dirty RAM word, then control passes back to step S55, otherwise control passes to step S57.

If the comparison in step S55 indicates that the selected dirty group bit is set (either because this is true or because this is simulated as a result of step S53), then in step S58 the corresponding word 224 is read from the second level dirty RAM 220.

In step S59 a parity check is made. If the parity check indicates an error then all the dirty bits are held to be in the dirtied (set) state (even if they are not in that state). In this case, in step S59, the control logic is either operable to set all of the dirty bits of the word in question to the set state, or is operable to supply a false indication at step S60 (described below) simulating this. Following step S59, or in the case that no parity error is detected, control passes to step S61.

In step S61, a first dirty bit in the selected second level dirty RAM word is selected.

In step S62, the selected dirty bit is compared with the given value (in this example "1").

If the comparison in step S62 indicates that the selected dirty bit is not set, then in step S64, the next dirty bit in the second level dirty RAM word 224 is selected, if there is one. If there is a further bit to be analysed in the selected second level dirty RAM word, then control passes back to step S62, otherwise control passes back to step S56.

If the comparison in step S62 indicates that the selected dirty bit is set (either because this is true or because this is simulated as a result of step S60), then in step S63 the corresponding page of memory is copied between processors as being dirty. Then, in step S64, the next dirty bit in the second level dirty RAM word 224 is selected, if there is one. If there is a further bit to be analysed in the selected second level dirty RAM word, then control passes back to step S62, otherwise control passes back to step S56.

In step S56, the next dirty group bit in the first level dirty RAM word 214 is selected, if there is one. If there is a further bit to be analysed in the current first level dirty RAM word, then control passes back to step S55, otherwise control passes to step S57.

In step S57, the next word in the first level dirty RAM word 214 is selected, if there is one. If there is a further word to be analysed in the first level dirty RAM, then control passes back to step S55, otherwise control passes to step S65.

In step 65, an assessment is made as to whether a further cycle in needed for reintegrating the memories. This can be determined on a number of different bases. This can be done on the number of pages of memory that were copied in the last pass, the elapsed time, or any other suitable basis. If another pass is to be performed, then control passes back to step S51. Otherwise, in step S66, measures are undertaken to termination the reintegration.

Typically, there will still be some dirtied pages after a number of cycles of the above method. Accordingly, the measures to terminate the reintegration will involve one last pass through the above cycle, but with no other system activity so that no further dirtying of main memory can occur.

The control of the above process could be effected using software. Indeed, in prior systems software has been use to read the dirty RAM. However, this can also slow the process of reading the dirty RAMs.

Indeed, in prior fault tolerant processing systems, the transfer of pages between processing sets to effect reintegration has been effected by software operable on a controlling processing set, for example a processing set that has been determined to be functioning correctly. However, this can have a not insignificant impact of the performance of the processing set concerned, and for a large memory can be a factor in slowing the reintegration of an equivalent memory state.

Figure 13:
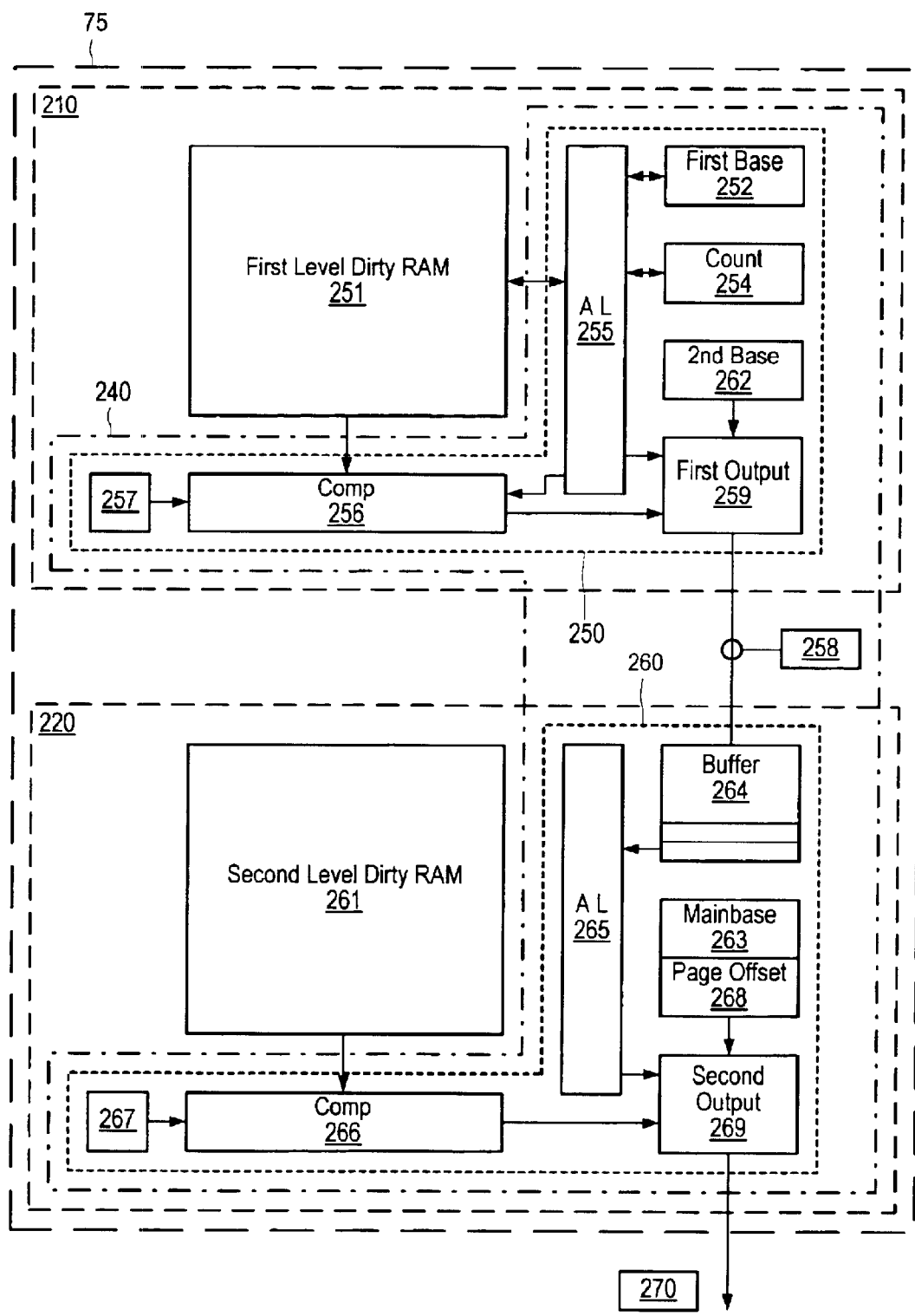
FIG. 13 is a schematic block diagram of control logic for implementing integrated search logic for a dirty RAM.

FIG. 13 is a schematic block diagram of control logic for implementing integrated search logic for searching a two-level dirty RAM as described above. The use of integrated control logic speeds access to the information in the dirty RAM. The integrated control logic can be implemented, for example, in a programmable gate array (e.g. a Field Programmable Gate Array FPGA) circuit, an Application Specific Integrated Circuit (ASIC) or the like.

As shown in FIG. 13, control logic 240 is split into first control logic 250 for controlling access to the first level dirty RAM storage 251 and second control logic 260 for controlling access to the second level dirty RAM storage 261. As will be apparent from the following, the first and second control logic each form sequential search logic for searching the associated level of the dirty RAM to identify dirty group bits and dirty bits, respectively, that are set to the "dirty" value.

The first level dirty RAM storage 251 can be implemented as static RAM, preferably within the same integrated circuit as the control logic 240. In such a case, although the analysis of the bits of a word were described with reference to FIG. 12 as being analysed serially, as would be the case is a software implemented example, each word can be analysed in parallel by the control logic 240.

The first control logic 250 includes a first level base register 252 and a first level count register 254. The first level base register 252 contents point to the base of the first level dirty RAM storage 251. The first level count register 254 is used for indicating a current word within the first level dirty RAM storage 251 that is being accessed.

The first control logic 250 is configured to read a word at a time from the first level dirty RAM storage 251. The first control logic 250 includes first address logic 255 that initialises the first level count register 254 to 0 and then reads the first word of the first level dirty RAM storage 251 at the base address indicated by the base register 252. The first control logic 250 also comprises first comparison logic 256. Each bit of that word is compared in parallel in the first comparison logic 256 to identify bits having a predetermined value (1 or 0) 257 indicative that a group of indicator bits in the second level dirty RAM 220 includes at least one bit set to the given value indicative that a page of main memory is dirty.

After being read and compared, the bits of the first level word are reset to a value other than the predetermined value, so that that portion of the first level dirty RAM storage 210 is able to record a subsequent dirtying of an associated group of bits of the second level dirty RAM 220.

The first control logic 250 comprises first output logic 259 that is operable to serialise the output of the first control logic for passing successive address values 258 to the second level control logic 260 for controlling the addressing of the second level dirty RAM storage 261. For each bit in the current first dirty RAM storage 251 that is set to the predetermined value, the first output logic 259 is operable to issue an address value 258 to the second control logic 260.

The address value 258 designates the address of the word in second level dirty RAM storage 261 that corresponds to the dirty group bit in the first level dirty RAM that was set to "dirty". The output logic 259 is responsive to the address of the word in the first dirty RAM storage 251 represented by current first level count of the count register 254 and an offset representative of the bit position within the word currently being analysed by the comparison logic 256. The first output logic 259 is also responsive to a second level base register 262 that represents the base address of the second level base dirty RAM storage. From these data, and the number of dirty group bits per first level dirty RAM storage word, the first output logic 259 is able to calculate the address of the word in the second level dirty RAM storage 261 corresponding to a dirty bit in the first level dirty RAM storage word currently being analysed by the first comparison logic 256.

The first comparison logic 256 can be operable to check whether parity is correct using the parity bit described with reference to FIG. 11A. If the parity is found to be correct for the word currently being checked, then the output logic 259 is operable to output an address value for each bit to the second level control logic 260. This effectively simulates a situation in which all bits of that word are set to the predetermined value (i.e., as indicative of all the corresponding words of the second level dirty RAM having at least one bit set "dirtied"). The reason for this is that in the event of a parity error, the validity of that word cannot be relied upon.

If no bits are set to the predetermined value in the word being examined and the parity check performed by the first comparison logic 256 shows that the parity is valid, or after all the address values for the bits which were set to that predetermined value have been processed by the first control logic 250 and/or sent to the second control logic 260, then the first address logic 255 of the control logic 250 proceeds to the next first level word. To do this, the first address logic 255 increments the first level count register 254 and then reads the next word of the first level dirty RAM storage 251 at the address indicated by the base address in the base address register 252 and the current first level count indicated by the first level count register 254. This process continues until the whole of the first level dirty RAM storage 251 has been read.

In parallel with the operation of the first control logic 250, the second control logic 260 is responsive the address values 258 supplied by the first control logic to access the second level dirty RAM storage 261.

The second level control logic 260 includes an address buffer 264 that holds the address values received from the first level control logic 250. As mentioned above, each address value 258 designates the address of a word in second level dirty RAM storage 261 that corresponds to a dirty group bit in the first level dirty RAM that was set to "dirty". The second control logic 260 includes second level address logic 265 that is operable to read successive values from the address buffer 262 for addressing the second level dirty RAM storage 261.

For each second level dirty RAM storage 261 address read from the address buffer 264, the second address logic 265 addresses a corresponding word in the second level dirty RAM storage 261. The second control logic 260 also includes a second comparison logic 266. Each bit of that word is compared in parallel in the second comparison logic 266 to identify bits having a given value (1 or 0) 267 indicative that a corresponding page in memory is dirty. After comparison the bits of that word are reset to a value other than the given value, so that that portion of the second level dirty RAM storage 261 is able to record a subsequent dirtying of an associated page of main memory.

The second control logic 260 comprises second output logic 269 that is operable to serialise the output of the second control logic for outputting successive commands for pages of memory to be copied from one processing set to another to effect the memory reintegration. For each bit that is set to the predetermined value of the second level dirty RAM storage 261 word currently being analysed, the second output logic 269 is operable to issue a command 270 specifying a page of memory to be copied.

The computation of the relevant page(s) of memory can readily be effected given that the second level dirty RAM is a map of the main memory and the page size of main memory is known. The second output logic 269 can be made responsive to a main memory base address register 263 and a page offset register 268 indicating the size of a page of main memory. Alternatively, these values could be hard wired into the second level control logic 260. The base value and page size can be used readily to compute the base address for a page to be copied according to the position of the associated dirty indicator in the second level dirty RAM storage 261.

The second level address logic 260 is operable to repeat this process for each second level count in the count buffer until the count buffer 262 is empty and the first control logic 250 has completed the analysis of the whole of the first level dirty RAM storage 251.

The second comparison logic 264 can also be operable to check whether parity is correct using the parity bit described with reference to FIG. 11A. If the parity is found to be correct for the word currently being checked, then the second output logic 269 is operable to output a command each bit of the second level dirty RAM storage 261 word for which the parity was incorrect. This effectively simulates a situation in which all bits of that word are set to the predetermined value (i.e., as indicative of all the corresponding pages of memory having been dirtied). The reason for this is that in the event of a parity error, the validity of that word cannot be relied upon.

The control logic 240 can also be operable to monitor the memory coherence traffic in response to DMA operations, or to be responsive to other circuitry for monitoring memory coherence traffic, to set the appropriate indicators in the first and second level dirty RAMs 210, 220 as memory pages in main memory are dirtied. The control logic 240 uses the same known parameters of main memory base address and page size to compute a dirty indicator to be set in second level dirty RAM and the word size of the first and second level dirty RAMs to determine the dirty group indicator to be set in the first level dirty RAM 210 in response to receipt of an indication of a page (e.g. and address within a page) 270 that has been dirtied.

FIG. 13 indicates the use of comparators 256, 264. However, the first and second level RAMs 210, 220 could be implemented as associative memories, whereby the comparison function could be an integral part of the dirty RAM storage 251/261.

FIG. 13 also shows a single first level dirty RAM 210 and a single second level dirty RAM 220. However, in order further to accelerate access to the data in the first and/or second level dirty RAMS 210/220, one or both of the dirty RAMS could be subdivided and the control logic could be split so that parallel processing within a level is provided. In this manner, a hybrid arrangement of a plurality of sequential engines working in parallel could be provided.

Figure 14:
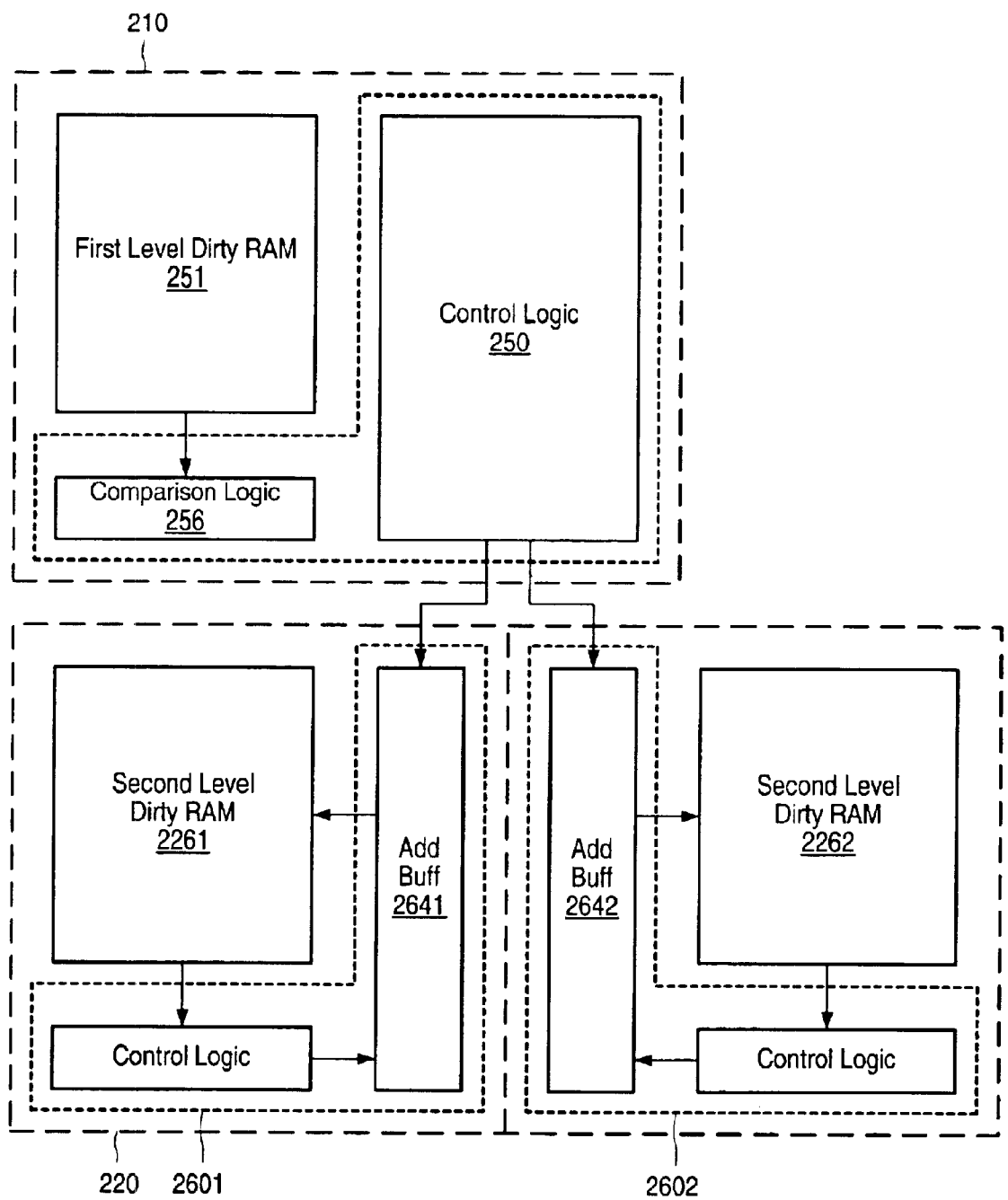
FIG. 14 illustrates an example of a dirty RAM with parallel search engines.

FIG. 14 is a simplified block diagram of a dirty RAM which is generally similar to that of FIG. 13, but in which the second level dirty RAM storage 261 is split into a first part 2261 and a second part 2262. The second level control logic 260 is similarly split into first and second parts 2601 and 2602. In this case, the first part of the second level dirty RAM storage 2262 contains odd groups of dirty indicators and the second part of the second level dirty RAM storage 2262 contains even groups of dirty indicators. First and second address buffers 2641 and 2642 are provided, with odd address values going to the first address buffer 2641 for processing by the first part 2601 of the second level control logic 260 and even address values going to the second address buffer 2642 for processing by the second part 2602 of the second level control logic 260. The address values are directed as appropriate by the first level control logic 250 of the first level dirty RAM 210. In this case, each of the first and second parts of the second level control logic 2601 and 2602 operate in the same manner as the second level control logic 260 of FIG. 13, with the exception that the logic takes account of the splitting of the second level dirty RAM into the first and second parts when determining a word to be read in response to the received count values in the count buffers 2621 and 2622 and when computing a page address for effecting the copying of a page of memory between processing sets.

The first and second parts 2601 and 2602 of the second level control logic can be thought of as first and second sequential search engines that search the second level dirty RAM storage in parallel.

It will be appreciated that more than two partitions, each with its own sequential search engine, could be used to increase the degree of parallelism and thereby increase processing speed, although this would further increase the implementation cost due to the increased complexity. Further, as indicated above, the use of parallel parts could be used for the first level dirty memory as well. In this case, the first and second parts could effectively operate independently in parallel for the first and second level dirty memories, providing a form of dirty memory parallel pipeline.

In the above examples, each page of memory is represented by a single bit in lowest level dirty RAM storage (e.g. in storage 261 of FIG. 12). To address possible spontaneous storage corruption, for example by cosmic ray hits, a parity bit can be associated with each word. However, a single parity bit can only protect against an odd number of bits in a word being corrupted. Accordingly, in alternative examples, more than one parity bit per word may be provided.

In one embodiment of the invention, to further safeguard against the problem of spontaneous storage errors, for example as a result of cosmic ray impacts, the dirty RAM storage is duplicated, and a comparison is made between the data stored in each dirty RAM storage.

Figure 15:
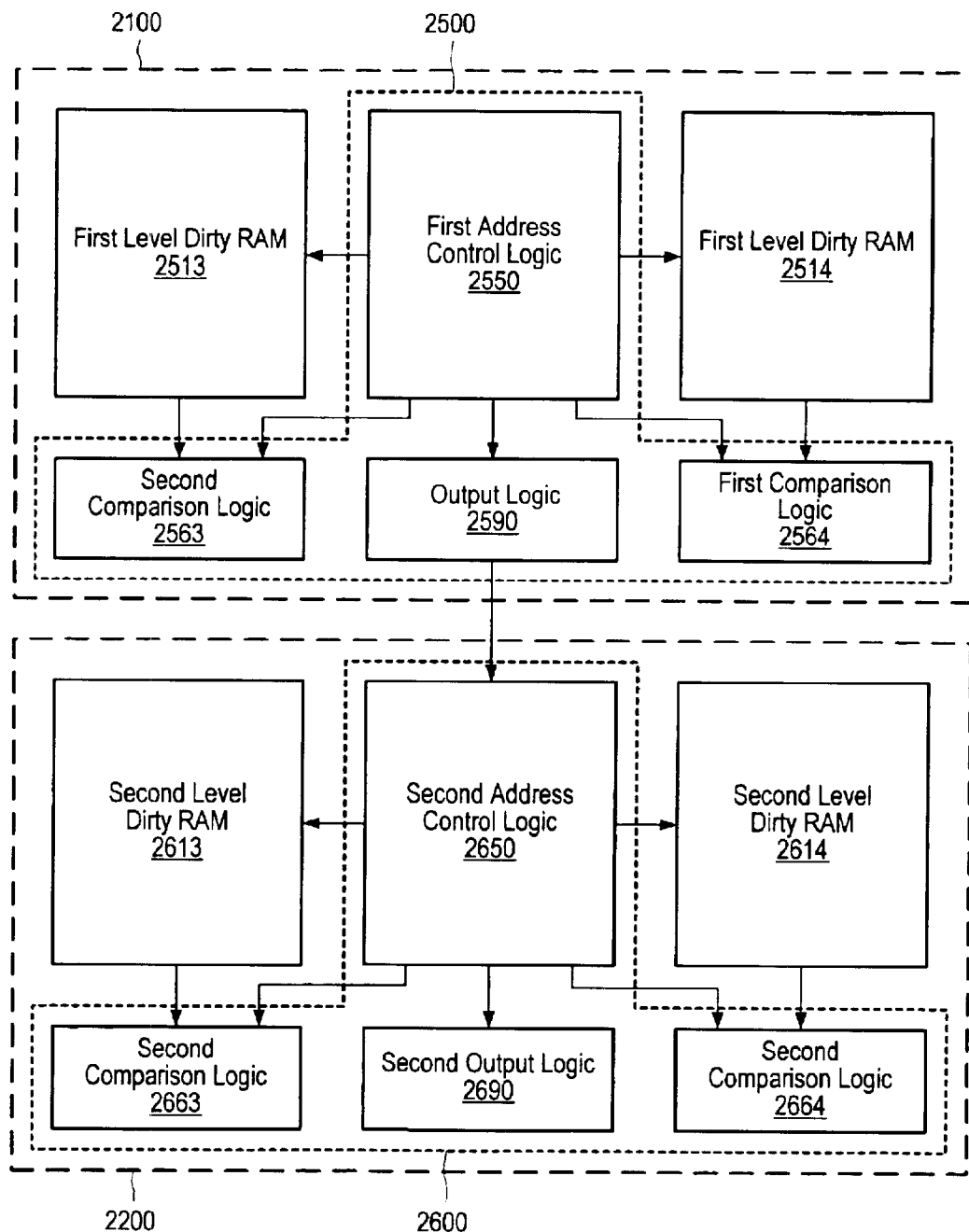
FIG. 15 is a schematic representation of a dirty memory subsystem with redundant storage of dirty indicators.

FIG. 15 illustrates an exemplary embodiment of this based on the dirty RAM of FIG. 13. In FIG. 15, both the first and second level dirty RAM storage 251 and 261 of FIG. 13 are duplicated into first and second parts 2513/2514 and 2613/2614, respectively. The first control logic 250 and the second control logic 260 of FIG. 13 are modified to provide first and second control logic 2500 and 2600, respectively.

As indicated, the address control logic 2550 of the first control logic 2500 is arranged to address both parts of the first level dirty RAM storage 2513/2514. The first comparison logic 256 of FIG. 12 is duplicated to provide comparison logic 2563/2564 for both parts of the first level dirty RAM storage 2513/2524. The operation of the first level dirty RAM 2100 of FIG. 15 corresponds generally to that of the first level dirty RAM 210 of FIG. 12. However, the storage of dirty group bits is duplicated in both parts of the first level dirty RAM storage 2513/2514. Also, in operation, the first output logic 2590 is operable to receive the output of the comparison logic 2563/2564 for both parts of the first level dirty RAM storage 2513/2524.

If the output of either comparison for a given dirty group bit indicates that the dirty group bit is set to the predetermined value indicative that a corresponding group of bits in the second level dirty RAM storage might have at least one bit dirty, then it is assumed that the corresponding group of bits is indeed dirty. If there is a difference between the results of the comparisons for equivalent dirty group bits in the two part of the first level dirty RAM storage 2513/2514, then it can be assumed that there has been storage corruption and the dirty group bit concerned is unreliable. As a result, as a precaution it should be assumed that the dirty group bit concerned in the first level dirty RAM storage 2523/2514 should be considered as dirty and the corresponding group of bits needs to be checked for any dirty bits being set dirty. In such a case, therefore, the first output logic 2590 is operable to issue an address value 258 to the second control logic 2600 for instructing the reading of the corresponding pair of the words from the first and second parts 2613 and 2614 of the second level dirty RAM storage.

In FIG. 15, the comparison can be made bit by bit in the first level dirty RAM storage, and in the event of a difference, only that dirty group bit needs to be considered as suspect. It is not necessary to consider a whole word as being suspect as is the case where a word-based parity is used.

The address control logic 2650 of the second control logic 2600 is arranged to address both parts of the second level dirty RAM storage 2613/2614. The second comparison logic 266 of FIG. 12 is duplicated to provide comparison logic 2663/2664 for both parts of the second level dirty RAM storage 2613/2624. The operation of the second level dirty RAM 2200 of FIG. 15 corresponds generally to that of the first level dirty RAM 220 of FIG. 12. However, the storage of dirty bits is duplicated in both parts of the second level dirty RAM storage 2613/2614. Also, in operation, the second output logic 2690 is operable to receive the output of the comparison logic 2663/2664 for both parts of the second level dirty RAM storage 2613/2614.

If the output of either comparison for a given dirty bit indicates that the dirty bit is set to the predetermined value indicative that a corresponding page of main memory might have been dirtied, then it is assumed that the page of main memory has indeed been dirtied. If there is a difference between the results of the comparisons for equivalent bits in the two part of the second level dirty RAM storage 2613/2614, then it can be assumed that there has been storage corruption and the dirty bit concerned is unreliable. As a result, as a precaution, it should be assumed that the bit concerned in the second level dirty RAM storage 2613/2614 should be considered as dirty and the corresponding page of memory needs to be copied from one memory to another between processing sets. The second output logic 2690 is therefore is operable to issue a command specifying that the relevant page of memory is to be copied.

In FIG. 15, the comparison can be made bit by bit in the second level dirty RAM storage 2613/2614, and in the event of a difference, only the relevant dirty bit needs to be considered as suspect. It is not necessary to consider a whole word as being suspect as is the case where a word-based parity is used.

The use of one or more parity bit(s) and duplication of dirty RAM storage can, of course be used in combination to enhance the possibility of detecting and addressing spontaneous memory corruption, for example due to cosmic ray impacts.

In the above description, it is assumed that the actual transfer of the pages of memory that are found to be dirtied is performed by software in the processing sets, whether or not the search for the dirty RAM is performed by software or by control logic such as the control logic 240. Thus, for example, the commands output by the second control logic 269 of Figure would typically be used to cause software to control the copying of pages of memory between processing sets. Thus, irrespective of the technique used to identify the pages to be transferred, there can still be a processing overhead in actually transferring the dirtied pages of memory.

Figure 16:
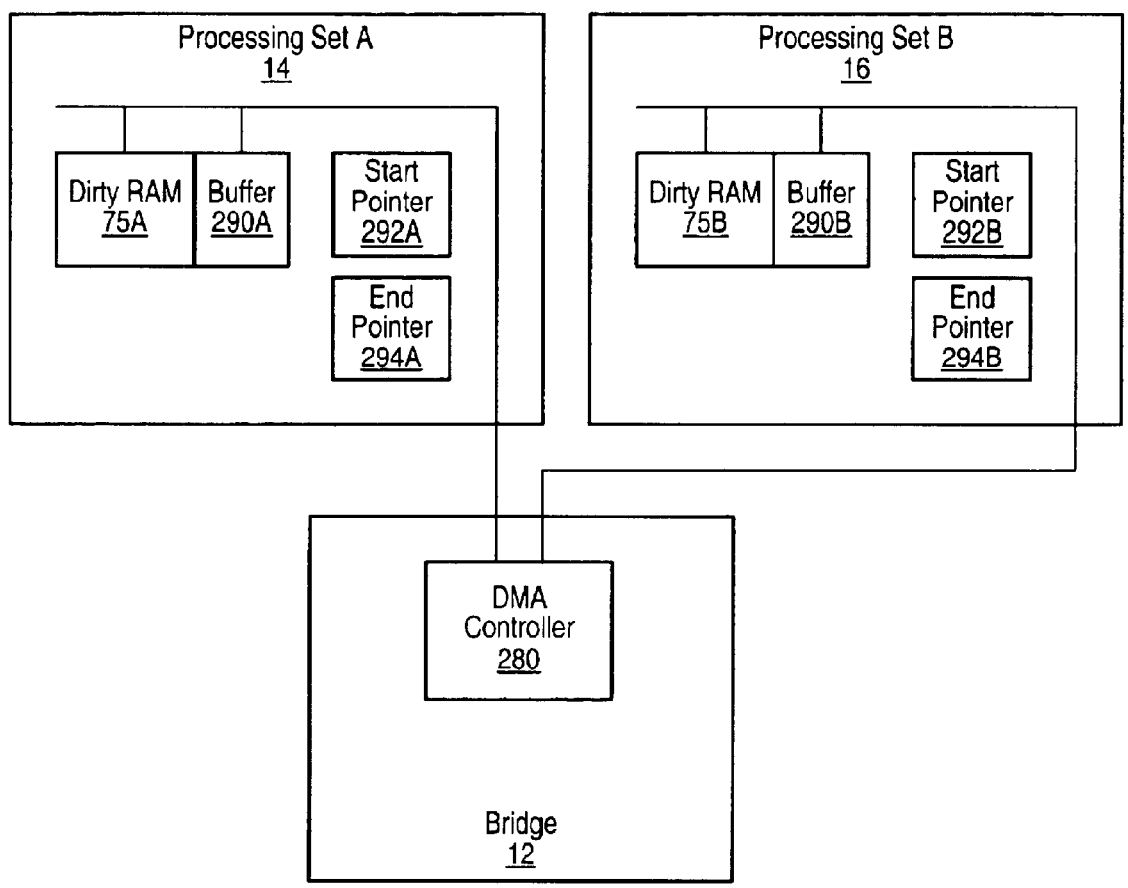
FIG. 16 is a schematic diagram of a fault tolerant computer system with a direct memory access controller for page reintegration.

FIG. 16 illustrates an exemplary arrangement for reducing this part of the processing overhead in reintegration. In this arrangement, a DMA controller 280 in the bridge 12 is used to control the transfer of the memory pages. This arrangement is based on the arrangement of a dirty RAM as shown in FIG. 13. However, in this case, the second output logic 269 of FIG. 13 is arranged to store the initial addresses of the pages in a buffer 290 that is externally addressable. The buffer can be arranged as a first-in-first-out buffer, or as a ring buffer. Thus, during a reintegration process, the addresses of any pages that need to be copied from one memory to another are placed in sequence in the buffer 290 by the second output logic 269.

The bridge is provided with a direct memory access (DMA) controller 280 that is able to access the buffer 290, for example during a reintegration process to determine whether any pages of memory need to be copied.

The DMA controller 280 could be of a conventional design, and could simply be instructed that a page needs to be copied in many ways. For example, the second output logic 269 could be arranged to send a command to the DMA controller 280 to commence a data transfer. Alternatively, the DMA controller 280 could be configured to interrogate the buffer automatically to determine whether it contains any addresses of pages to be copied.

In one example, the DMA controller 280 is arranged to perform a single pass through the dirty RAM and then stop, raising an interrupt. In an alternative example, the DMA controller is arranged to perform multiple passes until a pass limit is reached or the number of dirty pages has fallen below a threshold. The DMA controller 280 is provided with a counter (implemented in hardware or software) that is used to count the number of dirty pages found to give an indication of how close the processing sets are to convergence.

The IO bandwidth granted to the DMA controller 280 can be controlled in different ways to provide a trade-off between the speed of re-integration and the impact on system IO performance. For example, the DMA controller 280 can be granted an arbitration sot on a round-robin basis or be guaranteed one slot in N, or M slots in N to the extent that M=N results in the exclusion of all other IO traffic during reintegration.

Whether the buffer 290 contains addresses to be copied or not could be signalled in many ways.

For example a count (e.g. in a register or a memory location) associated with the buffer 290 can be used to indicate whether the buffer is empty or not. The count could be incremented by the second output logic 269 each time a page address is added to the buffer and the count could be decremented by the DMA logic each time the DMA controller copies the page to which the page address relates. In this way, where the count is zero, say, then the buffer is empty. When the count has a non-zero value, then there are a number of page addresses, equal to the count value, in the buffer 290.

Alternatively, if the buffer 290 is configured as a ring buffer, separate start and end pointers 292, 294 could be used to encompass a portion of the ring buffer that contains valid entries. The start and end pointers could be managed by the dirty RAM control logic 240 and/or the DMA controller 280. Where the start and end pointers coincide, this would indicate that the buffer was empty, and where they differ, this would indicate that there is valid data to be read. An example of the use of a ring buffer for use with a DMA controller for controlling the transfer of blocks of data is described, for example, in European patent application EP-A-1,026,596, the content of which is incorporated herein by reference.

Conveniently, the DMA controller is configured to copy a page of memory at a time. In this way, the DMA controller then merely needs to know the direction in which the copy operation is to be performed and the start address for a page of memory to be copied. The former information can be supplied by the processing set that controls the reintegration process (i.e. the processing set which becomes the primary processing set as described with reference to FIG. 11) at the start of the reintegration process. The latter information is placed in the buffer 290 by the second output logic 269 as described above. In this way the DMA controller is readily able to control the transfer of the memory pages without further processor involvement, thus minimising the processor overhead.

As an alternative to placing the output of the second output logic 269 in a buffer 290 in the dirty RAM 75, the second output logic 269 could supply the addresses of the pages to be copied directly to the DMA controller 280. A buffer corresponding to the buffer 290 could be included in the DMA controller 280.

In the above, it is assumed that that actual re-integration process is instigated by software operable on the processing sets when reintegration is required, whether or not control logic such as the control logic 240 is used to control the searching of the dirty RAM for dirty bits. Even this process does involve some processor overhead.

In a further example, therefore, the instigation of the search process for the dirty RAM is directly controlled by the DMA controller 280. Thus the DMA controller can be caused to search the dirty RAM 75 for any bits set to dirty, preferably by initiating the operation of the control logic 240 as described with reference to FIG. 13.

In the above-described example, the grouping of dirty bits and the storage of dirty bits and dirty group bits based on 64 bit words is envisaged. However, it will be appreciated that other word lengths could be used. For example, by suitably arranging four static 64 bit RAM chips, a 256 bit wide word could be configured. Also the grouping of dirty bits and/or the dirty group bits and/or the use of parity need not be word-based, but could be based on some other memory subset.

Also, although reference is made to implementing at least part of the hierarchical dirty memory in static random access memory, the invention is not limited thereto. Indeed, the storage technology used to implement the hierarchical dirty memory could be implemented using any storage technology applicable to a particular application. Moreover, the storage could be configured to be wholly, partly or non-associative according to a desired specific implementation. Also, the logic to control the operation of the hierarchical dirty memory could be implemented in any suitable manner, in accordance with the performance requirements of any specific application.

Also, although a two-level hierarchical memory is described, it will be appreciated that the hierarchy could be extended beyond two levels. The number of levels can be chosen as appropriate taking into account the overall main memory size, the page size, the word length of the dirty RAM and bus configuration as well as overall performance targets for reintegration following an error state.

Figure 17:
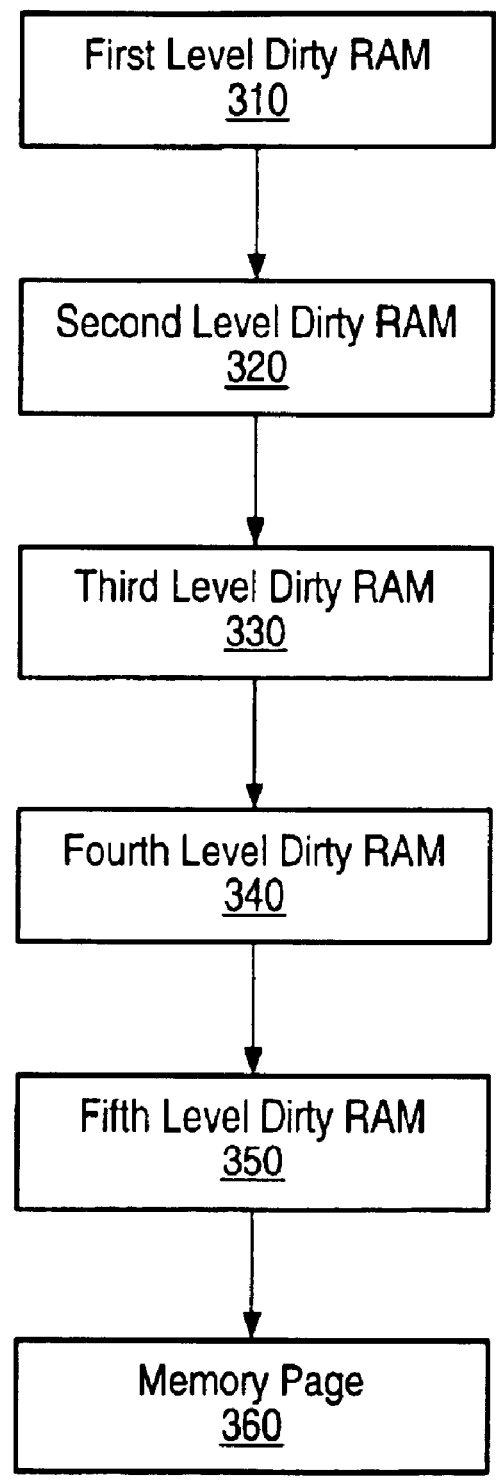
FIG. 17 is a schematic representation of a dirty memory with more than two hierarchical stages.

For example, a first level dirty RAM could be chosen to be of a size that can fit within one or a small number of registers. For example, as shown in FIG. 17, a three level hierarchy is shown with a first level dirty RAM 310 that is one word long with 64-bits, each bit of the first level dirty RAM 310 being able to be associated with a respective 64-bit word in a 64 word second level dirty RAM 320, each bit in the second level dirty RAM 320 being able to be associated with a 64-bit word in a third level dirty RAM 330, each bit in the third level dirty RAM 330 being able to be associated with a 64-bit word in a fourth level dirty RAM 340, each bit in the fourth level dirty RAM 340 being able to be associated with a 64-bit word in a fifth level dirty RAM 350, and each bit in the fifth level dirty RAM 350 being able to be associated with a respective page in main memory 360. With such an arrangement, up to 64*64*64*64*64, that is over 1000 GB of main memory with a page size of 1 Kbytes could be accommodated starting from a first level dirty RAM that is only one word of 64 bits in length.

It will be appreciated that one does not need to start at a first level dirty RAM only one word long, and that some of the levels may thereby be dispensed with. Also, it will be appreciated that other word lengths could be used in other examples.

Accordingly, there has been described, a dirty memory subsystem that includes storage operable to store redundant copies of dirty indicators. Each dirty indicator is associated with a respective block of main memory and is settable to a predetermined state to indicate that the block of main memory associated therewith has been dirtied. By providing redundant storage for the dirty indicators, any difference between the stored copies of the dirty indicators can be considered as indicative of memory corruption, for example as a result of a cosmic ray impact. As the different copies can be stored in different locations, it is unlikely that a cosmic ray impact would affect all copies equally. If a difference between the stored copies is detected, then the dirty indicator can be taken as being unreliable, and remedial action can be taken. For example, as described herein, it can be assumed that a block of main memory has been dirtied if any of the copies of the dirty indicator has the predetermined state.

Although particular embodiments of the invention have been described, it will be appreciated that many modifications/additions and/or substitutions may be made within the spirit and scope of the invention.

For example, although in the described embodiments, only two copies of a dirty indicator are stored in each of two separate parts of a dirty RAM, in other embodiments, more copies could be stored in further parts of a dirty RAM. The different "parts" could, for example, be in different memory chips to reduce the chance of a single cosmic ray impact damaging more than one copy of a dirty indicator.

Also, in the described embodiments, the remedial action taken, when there is a discrepancy between the stored copies of the dirty indicators, is to assume that both should have been set to the dirty state (i.e. that they should have a predetermined value indicative of an associated main memory page being dirty). As the overhead in copying a single page of main memory is not huge and cosmic ray upsets are infrequent, this has been found to be a reasonable approach. However, it should be noted that other approaches to addressing such a discrepancy could be taken. For example, a parity error could be used to indicate which of the dirty indicators has been corrupted. Alternatively, if three copies of a dirty indicator are stored, then a majority voting approach could be taken to determine which of the stored values is correct. In such cases, remedial action could then be taken on the basis of the state determined to be the correct one for the dirty indicator in question.

Further, although in the above the expression "dirty RAM(s)" has been used to describe the storage for the dirty bits and dirty group bits, it should be noted that this is used as a name rather than a specific reference to the storage technology used being a random access memory. In practice, random access memory will typically be used for this storage. However, it should be understood in the context of the present invention that any form of memory technology that permits reading and writing can be used to implement the so-called "dirty RAMs".

Although the present invention is described in the context of a particular configuration of a fault tolerant computer system, the use of a dirty memory as described herein is not is not limited thereto, but could be used in other computing systems. For example, a dirty memory as described herein could be used in a computer system as described in U.S. Pat. No. 5,627,965, or for the dirty memory in the bridge in WO 99/66402. Indeed, a dirty memory as described herein could find an application in virtually any computer system where a conventional dirty memory has been employed.

What is claimed is:

1. A dirty memory subsystem for a computer system, the dirty memory subsystem comprising:
   storage operable to store dirty indicators and corresponding redundant copies of the dirty indicators, wherein each dirty indicator and the corresponding redundant dirty indicator being associated with a respective block of main memory and being settable to a predetermined state to indicate that the block of main memory associated therewith has been dirtied; and
   a control logic operable to read the dirty indicator and the corresponding redundant dirty indicator from storage and to treat the block of memory associated therewith as dirtied if all or any one of the dirty indicator and the corresponding redundant dirty indicator has the predetermined state.

2. The dirty memory subsystem of claim 1, wherein the dirty indicators being stored in groups with each group having associated therewith a parity indicator computed from the dirty indicator values of the group, wherein the control logic being operable on reading the dirty indicators of a group and a corresponding parity indicator to calculate a parity indicator value based on the dirty indicator values read for the group to determine an integrity of the group, wherein the control logic is configured to identify all dirty indicators of the group as representing a dirtied state where the calculated parity indicator value is different from the parity indicator value read for that group.

3. The dirty memory subsystem of claim 1, wherein in response to all or any of the dirty indicator and the corresponding redundant dirty indicator having the predetermined state, the control logic is operable to cause the block of memory associated with the dirty indicator and the corresponding redundant dirty indicator to be copied from the main memory to another memory.

4. The dirty memory subsystem of claim 3, wherein the other memory is another main memory.

5. The dirty memory subsystem of claim 1, operable to reset each of the dirty indicator and the corresponding redundant dirty indicator to a state other than the predetermined state after reading the dirty indicator and the corresponding redundant dirty indicator.

6. The dirty memory subsystem of claim 1, wherein the storage comprises at least two memory units, one memory unit for storing the dirty indicators and another memory unit for storing the corresponding redundant dirty indicators.

7. The dirty memory subsystem of claim 6, wherein the control logic includes comparison logic for each of the memory units for determining whether all or any of the dirty indicator and the corresponding redundant dirty indicator is set to the predetermined state.

8. The dirty memory subsystem of claim 7, wherein the control logic includes output logic responsive to the output of each comparison logic for determining whether a block of memory associated with a dirty indicator and the corresponding redundant dirty indicator is to be treated as dirtied.

9. The dirty memory subsystem of claim 1, wherein each dirty indicator comprises a single bit.

10. The dirty memory subsystem of claim 1, wherein a block of main memory is a page of main memory.

11. The dirty memory subsystem of claim 1, wherein the storage comprises a lower level memory that includes groups of the dirty indicators and groups of the corresponding redundant copies of the dirty indicators, and at least one higher level memory that includes groups of dirty group indicators and groups of corresponding redundant copies of the dirty group indicators, wherein each dirty group indicator and a corresponding redundant dirty group indicator being settable to a given state indicative that a group of dirty indicators of the lower level memory has at least one dirty indicator in the predetermined state indicative that a block of memory associated therewith has been dirtied.

12. The dirty memory subsystem of claim 11, wherein the control logic is operable to read a dirty group indicator and a corresponding redundant dirty group indicator from the higher level memory and to treat the group of dirty indicators associated therewith as dirtied in response to all or any one of the dirty group indicator and the corresponding redundant dirty group indicator having the given state.

13. The dirty memory subsystem of claim 12, wherein, in response to all or any one of the dirty group indicator and the corresponding redundant dirty group indicator having the given state, for each dirty indicator in the group of dirty indicators and for each corresponding redundant dirty indicator of the group of corresponding redundant dirty indicators, the control logic is operable to read the dirty indicator and the corresponding redundant dirty indicator from the lower level memory and to treat the block of memory associated therewith as dirtied in response to all or any one of the dirty indicator and the corresponding redundant dirty indicator having the predetermined state.

14. The dirty memory subsystem of claim 1, wherein, after both the dirty indicator and the corresponding redundant dirty indicator are read from storage, any difference between a state of the stored dirty indicator and corresponding dirty indicator is considered as indicative of memory corruption.

15. A computer system comprising a dirty memory subsystem and at least one processing set that includes main memory, the dirty memory subsystem comprising:
   storage operable to store dirty indicators and corresponding redundant copies of the dirty indicators, wherein each dirty indicator and the corresponding redundant dirty indicator being associated with a respective block of main memory and being settable to a predetermined state to indicate that the block of main memory associated therewith has been dirtied; and
   a control logic operable to read the dirty indicator and the corresponding redundant dirty indicator from storage and to treat the block of memory associated therewith as dirtied if all or any one of the dirty indicator and the corresponding redundant dirty indicator has the predetermined state.

16. The computer system of claim 15, comprising a plurality of processing sets that each include main memory.

17. The computer system of claim 16, wherein the processing sets are operable in lockstep, the computer system comprising logic operable to attempt to reinstate an equivalent memory state in the main memory of each of the processor following a lockstep error.

18. A method of managing reinstatement of an equivalent memory state in the main memory of a plurality of processing sets of a fault tolerant computer following a lock step error, wherein a dirty memory subsystem stores dirty indicators and corresponding redundant copies of the dirty indicators that are settable to a predetermined state indicative that a block of main memory associated therewith has been dirtied, the method including the performance of at least one cycle of copying any page of main memory that has been dirtied from a first processing set to each other processing set, each cycle including reading a dirty indicator and a corresponding redundant indicator from storage and treating a block of memory associated with the dirty indicator and the corresponding redundant dirty indicator as dirtied if all or any one of the dirty indicator and the corresponding redundant dirty indicator has the predetermined state.

19. The method of claim 18, further comprising in response to all or any of the dirty indicator and the corresponding redundant dirty indicator having the predetermined state, copying a block of memory associated with the dirty indicator and the corresponding redundant dirty indicator from the main memory to another memory.

20. The method of claim 19, wherein the other memory is another main memory.

21. The method of claim 18, further comprising resetting each of the dirty indicator and the corresponding redundant dirty indicator to a state other than the predetermined state after reading the dirty indicator and the corresponding redundant dirty indicator.

22. The method of claim 18, comprising maintaining the dirty indicators in one memory unit and the corresponding redundant dirty indicators in another memory unit.

23. The method of claim 22, comprising separately assessing the state of a dirty indicator and a corresponding redundant dirty indicator for each of the memory units for determining whether all or any one of the dirty indicator and the corresponding redundant dirty indicator is set to the predetermined state.

24. The method of claim 18, wherein the storage comprises a lower level memory that includes groups of the dirty indicators and groups of the corresponding redundant copies of the dirty indicators, and at least one higher level memory that includes groups of dirty group indicators and groups of corresponding redundant copies of the dirty group indicators, wherein each dirty group indicator and a corresponding redundant dirty group indicator being settable to a given state indicative that a group of dirty indicators of the lower level memory has at least one dirty indicator in the predetermined state indicative that a block of memory associated therewith has been dirtied.

25. The method of claim 24, further comprising reading a dirty group indicator and a corresponding redundant dirty group indicator from the higher level memory and treating the group of dirty indicators associated therewith as dirtied in response to all or any one of the dirty group indicator and the corresponding redundant dirty group indicator having the given state.

26. The method of claim 18, wherein each dirty indicator comprises a single bit.

27. The method of claim 18, wherein a block of main memory is a page of main memory.

28. A dirty memory subsystem for a computer system, the dirty memory subsystem comprising:
- a lower level memory operable to store groups of dirty indicators and groups of corresponding redundant copies of the dirty indicators, wherein each dirty indicator and the corresponding redundant dirty indicator being associated with a respective block of main memory and being settable to a predetermined state to indicate that the block of main memory associated therewith has been dirtied;
- at least one higher level memory operable to store groups of dirty group indicators and groups of corresponding redundant copies of the dirty group indicators, wherein each dirty group indicator and a corresponding redundant dirty group indicator being settable to a given state indicative that a group of dirty indicators of the lower level memory has at least one dirty indicator in the predetermined state indicative that a block of memory associated therewith has been dirtied;
- a control logic operable to read a dirty group indicator and a corresponding redundant dirty group indicator from the higher level memory and to treat the group of dirty indicators associated therewith as dirtied in response to all or any one of the dirty group indicator and the corresponding redundant dirty group indicator having the given state; and
- wherein, in response to all or any one of the dirty group indicator and the corresponding redundant dirty group indicator having the given state, for each dirty indicator in the group of dirty indicators and for each corresponding redundant dirty indicator of the group of corresponding redundant dirty indicators, the control logic is operable to read the dirty indicator and the corresponding redundant dirty indicator from the lower level memory and to treat the block of memory associated therewith as dirtied in response to all or any one of the dirty indicator and the corresponding redundant dirty indicator having the predetermined state.

* * * * *